(12) United States Patent
Ben-Dor et al.

(10) Patent No.: US 7,349,391 B2
(45) Date of Patent: Mar. 25, 2008

(54) TUNNELING BETWEEN A BUS AND A NETWORK

(75) Inventors: Avner Ben-Dor, Woodside, CA (US); James Goodwin, Santa Clara, CA (US); Joseph Meza, Milipitas, CA (US); Mark S. Young, Mountain View, CA (US); David Zalatimo, Menlo Park, CA (US)

(73) Assignee: F5 Networks, Inc., Seattle, WA (US)

( * ) Notice: Subject to any disclaimer, the term of this patent is extended or adjusted under 35 U.S.C. 154(b) by 742 days.

(21) Appl. No.: 09/272,807

(22) Filed: Mar. 19, 1999

(65) Prior Publication Data

US 2002/0141418 A1 Oct. 3, 2002

(51) Int. Cl.
*H04L 12/28* (2006.01)
*H04L 12/56* (2006.01)
*G06F 15/16* (2006.01)

(52) U.S. Cl. ............... 370/392; 370/230; 370/235; 370/466; 370/474; 709/253

(58) Field of Classification Search ........ 370/466–467, 370/469, 400–401, 420, 463, 352, 229–231, 370/235–236, 351, 354–357, 389, 392, 474; 709/250, 253, 227; 713/153
See application file for complete search history.

(56) References Cited

U.S. PATENT DOCUMENTS

| | | | |
|---|---|---|---|
| 5,325,362 A | 6/1994 | Aziz | |
| 5,548,646 A | 8/1996 | Aziz et al. | |
| 5,550,984 A | 8/1996 | Gelb | |
| 5,557,745 A | 9/1996 | Perlman et al. | |
| 5,740,374 A | 4/1998 | Raffali-Schreinemachers | |
| 5,752,003 A | 5/1998 | Hart | |
| 5,826,023 A | 10/1998 | Hall et al. | |
| 5,828,846 A | 10/1998 | Kirby et al. | |
| 5,898,784 A * | 4/1999 | Kirby et al. | 713/153 |
| 5,918,022 A * | 6/1999 | Batz et al. | 370/409 |
| 6,026,085 A * | 2/2000 | Chau et al. | 370/352 |
| 6,061,650 A * | 5/2000 | Malkin et al. | 370/401 |
| 6,085,328 A * | 7/2000 | Klein et al. | 709/227 |
| 6,108,345 A * | 8/2000 | Zhang | 370/445 |
| 6,289,207 B1 * | 9/2001 | Hudecek et al. | 455/150.1 |
| 6,324,178 B1 * | 11/2001 | Lo et al. | 370/392 |
| 6,353,427 B1 * | 3/2002 | Rosenberg | 345/156 |
| 6,538,996 B1 * | 3/2003 | West et al. | 370/238 |
| 6,751,221 B1 * | 6/2004 | Saito et al. | 370/392 |

* cited by examiner

*Primary Examiner*—Ronald Abelson
(74) *Attorney, Agent, or Firm*—Nixon Peabody, LLP

(57) ABSTRACT

A system is described having a network, a bus and an interface coupling the network to the bus. A host is coupled to the network and executes software to generate packets for communication on the network. A bus device is coupled to the bus. The interface and host coordinate to transport bus device packets between the host and the bus device via tunneling over the network.

30 Claims, 16 Drawing Sheets

TUNNELING BETWEEN A BUS AND A NETWORK

FIELD OF THE INVENTION

The present invention relates to the field of communication of information and network systems; more particularly, the present invention relates to tunneling of information between devices on a local area network (LAN) and devices on local buses, such as, for example, IEEE-1394 or Universal Serial Bus (USB) buses.

BACKGROUND OF THE INVENTION

Generally, tunneling is the transportation of one protocol across another protocol. That is, the transportation protocol encapsulates information formatted for one protocol at the sender, for delivery to a receiver using another protocol, where the transported information formatted for the original protocol can be decapsulated and interpreted by the receiver. Tunneling has been used in a number of different applications, primarily in the networking industry. An example of tunneling is the Point-to-Point protocol, where TCP/IP packets are tunneled across a physical medium (such as a phone line via modem). The TCP/IP packets are encapsulated within a transportation protocol, through a modem on the sender, across a telephone line, to a receiving modem, to the end receiver. The TCP/IP packet is then decapsulated from the transportation protocol. Tunneling is also used for encapsulation of IPV.6 over IPV.4 networks.

Today, a computer system can be coupled to a network and communicate with other network hosts over the network. Similarly, the same computer system may have access to and communicate with devices on local buses. Examples of two such local buses include the IEEE-1394 bus standard (1995) and the Universal Serial Bus (USB) standard. See IEEE 1394-1995, Standard for a High Performance Serial Bus; IEEE P1394a, Draft Standard for a High Performance Serial Bus (Supplement); IEEE P1394.1, Draft Standard for High Performance Serial Bus Bridges; IEEE P1394b, Draft Standard for a High Performance Serial Bus (Supplement); ISO/IEC 13213:1994, Control and Status Register (CSR) Architecture for Microcomputer Buses; IEC-61883, parts 1-6, Standard for Digital Interface for Consumer; Electronic Audio/Video Equipment; NCITS.325:1999: SBP-2: Serial Bus Protocol 2; and 1394 Open Host Controller Specification 1.0. Communication over these buses is dictated by their standards. Currently, devices on these buses can only be accessed by hosts locally attached to the devices' respective buses. In other words, other network hosts on the network may only access devices on these buses from remote locations with the help and permission of attached local host. Complicating matters further is the fact that communication over these buses is dictated by standards and often the standard form of communication on the buses is not the same as that over the network. What is needed is a way for hosts and devices on a network to access devices on such buses from remote locations, while preserving as much as possible the dynamic properties of being locally attached.

SUMMARY OF THE INVENTION

A system is described having a network, a bus and an interface coupling the network to the bus. A host is coupled to the network and executes software to generate packets for communication on the network. A bus device is coupled to the bus. The interface and host coordinate to transport bus device packets between the host and the bus device via tunneling over the network. The tunneling comprises the encapsulation of bus events into network protocols, the transportation of the encapsulated bus events over the networks, and the subsequent decapsulation of the encapsulated bus events.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
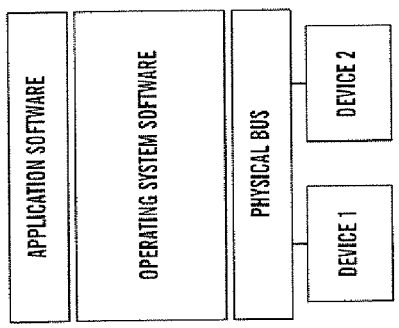
FIG. 1A illustrates a prior art software environment on a host.

A method and apparatus for transferring information between a host on a network and a device on a bus remotely located with respect to each other and between two bus devices on separate buses remotely located with respect to each other are described. In the following description, for purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMS, magnetic or optical cards, or any type of media suitable for storing electronic instructions, and each coupled to a computer system bus.

The algorithms and displays presented herein are not inherently related to any particular computer or other apparatus. Various general purpose machines may be used with programs in accordance with the teachings herein, or it may prove convenient to construct more specialized apparatus to perform the required method steps. The required structure for a variety of these machines will appear from the description below. In addition, the present invention is not described with reference to any particular programming language. It will be appreciated that a variety of programming languages may be used to implement the teachings of the invention as described herein.

The programs including executable instructions may be executed by one or more programming devices (e.g., a central processing unit (CPU), processor, controller, etc.) in one or more personal computer systems, servers, workstations, etc.

In this description, the following terms are used:

Remote Peripheral Server (RPS): a device that connects a local serial bus to a network. In one embodiment, an RPS connects IEEE-1394 and USB local bus devices to network hosts through use of tunneling. See Universal Serial Bus Specification Revision 1.1; OpenHCI (Open Host Controller Interface) Specification, Rev. 1.0a; and Universal Host Controller Interface Design Guide, Rev. 1.1. The RPS may be referred to as a tunneling endpoint.

RPS Network Port: A logical connection to the network from an RPS and is associated with an Internet Protocol (IP) address.

RPS Local Node ID: An IEEE-1394 node ID associated with the RPS.

Local Bus: A personal computer bus designed to simplify the task of adding peripherals by allowing them to communicate directly between themselves and with a processor, instead of being connected directly to the processor system bus. In one embodiment, the Local Bus is an individual IEEE-1394 or a USB bus.

Local Bus Device: A device coupled to a local bus. In one embodiment, a Local Bus device is an individual IEEE-1394 or USB device attached to a local bus. Such devices may include peripherals.

Network Host: this is any networking device supporting IP (or another network protocol) that has the ability to encapsulate/decapsulate local bus transfers (supports "tunneling") also referred to as a tunneling endpoint. As described below, in one embodiment, the network host has special software drivers installed to support tunneling on the network host. The network host may be a personal computer, a server, or any other computing device capable of executing software that is attached to, and can communicate on, a network. The network host may be referred to as a tunneling endpoint.

Tunneling: The encapsulation/decapsulation of local bus requests (e.g., IEEE-1394 and USB) over a network (e.g., IP-based Ethernet network) and allows remote network hosts to communicate with local bus devices. In one embodiment, the tunneling preserves local bus properties (e.g., bus timing, device announcement, device management, bus configuration, bus transactions, etc.)

Unique ID: A unique identifier associated with each bus device. In one embodiment, the Unique ID is an invariant 64-bit globally unique identifier. In one embodiment, each RPS also has unique IDs for the USB host and IEEE-1394 local node ID on the RPS itself.

Overview

Tunneling methods and apparatus are described herein which allow sharing and access to devices on a bus remotely across a network, while maintaining local bus properties.

The tunneling extends the concept of prior art protocol tunneling in a novel way. The tunneling discussed below is tunneling physical bus events, such as bus transactions and requests, for buses such as, for example, both 1394 serial bus and USB. The tunneling transports bus events that would normally occur on the sending node and recreates the bus events on a remotely located receiving node. Thus, unlike prior art tunneling, the tunneling described herein is dependent on a specific bus dynamic properties, such as, for example, those defined in the 1394 and USB standards. This is distinct from protocol tunneling which is a way to transport packets of one network media protocol across another network media protocol.

The tunneling described herein is a technique to transport bus events to a remote hardware platform and to recreate the sequence of bus events in order to communicate with devices attached to the remote (receiver) physical bus (either 1394 or USB). The advantage of this tunneling is that the sender can use devices attached to the receiver's local hardware as if it were attached locally. This concept is illustrated in FIGS. 1A and 1B.

Figure 1B:
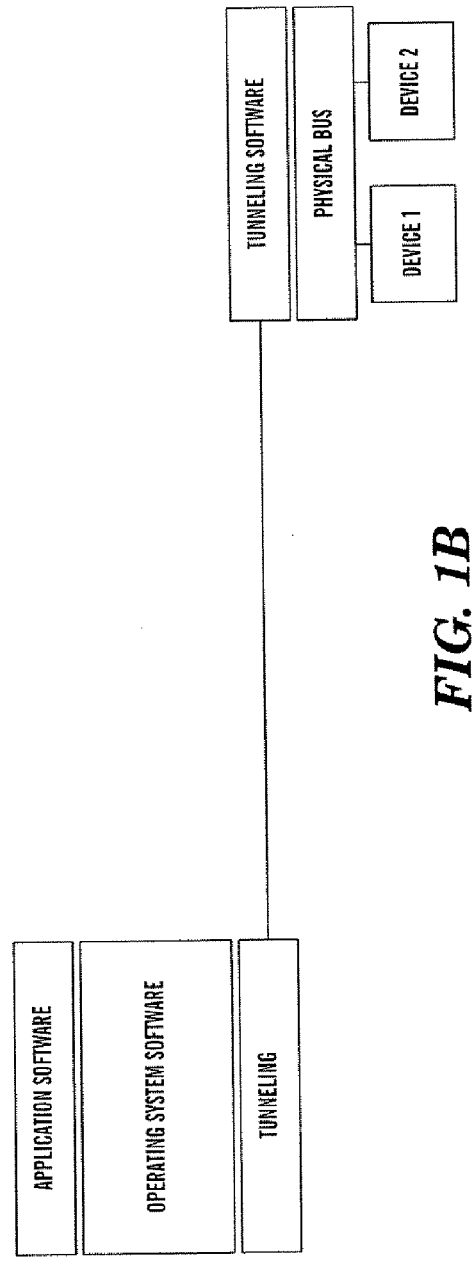
FIG. 1B illustrates an exemplary tunneling environment.

Referring to FIG. 1A, a typical host system is illustrated. Referring to FIG. 1A, application software communicates to devices (Device 1 and Device 2) attached to the host system via a physical system bus which is controlled by the operating system software. The tunneling described herein extends this concept across a distance through a network interface. Referring to FIG. 1B, operating system (O/S) transactions that are generated by O/S software, and normally communicated to physical hardware, undergo tunneling so that bus events can be sent across a network and can be recreated at a receiving site where a host or bus device may be located. At the remote receiving sites, tunneling software recreates the bus events and forwards them to the bus device. That is, a host system can communicate with devices that are remotely attached, via a network, as if the devices were attached locally to the system. Similarly, bus events generated by bus devices may undergo tunneling so that they may be transported across the network to a host or other bus device where tunneling software processes them.

Therefore, the tunneling described herein tunnels bus events (e.g., transactions, requests, etc.) across a network and includes the ability to capture bus events and encapsulate them into network protocols and the ability to decapsulate the bus event and recreate them at a remote location. In this manner, devices may be controlled across a network as if they were attached locally, thereby providing transparency of operation to a user on the host system.

In one embodiment, the network comprises an Internet Protocol (IP) based Ethernet network. In one embodiment, the bus may comprise an IEEE-1394 bus, a Universal Serial Bus (USB), or bus, such as serial buses. Thus, the devices are IEEE-1394 or USB devices.

The data being transferred may be isochronous. Therefore, the tunneling methods and apparatus set forth allows for tunneling of isochronous information over an asynchronous domain (e.g., ethernet domain). The tunneling includes the necessary control and configuration protocol necessary to manage connections between network hosts and remotely connected local bus devices, and to preserve their asynchronous and isochronous properties.

The tunneling of the bus events is performed using packets. A header associated with each packet may be used to describe the bus events (e.g., 1394 bus events, USB bus events) and the timing relationship of the data. Thus, in one embodiment, tunneling refers to herein the encapsulation and decapsulation of local bus (e.g., IEEE-1394, USB, etc.) transactions and requests within TCP/IP and UDP/IP packets across a network. In one embodiment, an RPS announcement packet (RAP), as described below, may be used for announcement, control, and configuration. Such a packet helps facilitate tunneling auto discovery and removal of the device management that is inherent in the physical layer protocol of buses, such as, for instance, IEEE-1394 and USB.

In one embodiment, tunneling is also facilitated by the use of redirection software that emulates local bus (e.g., 1394, USB) peripheral connectivity. When an application causes data to be transferred between the host and a local bus device (e.g., 1394 device, USB device), the operating system software intercepts the transmission in the case of an application generated data transfer and directs it to the network stack for transfer over the network. In the case of receiving data, when data is being received from a bus device over the network, the network stack redirects encapsulated bus device data to the stack in the operating system responsible for processing the incoming data (e.g., the 1394 stack to process the 1394 bus events tunneled over the network, the USB stack to process the USB bus events tunneled over the network).

The following description relates to one embodiment of delivery and communication methods supporting the "tunneling" of device transactions for devices, such as IEEE-1394 and USB devices, across an IP (Internet Protocol) based Ethernet network. Note that the following description will include an implementation of tunneling with respect to IEEE-1394 and USB devices and an IP based Ethernet network. However, the techniques and descriptions are not limited to such a specific implementation and are instead applicable to a wide variety of bus and networks.

System Overview

Figure 1C:
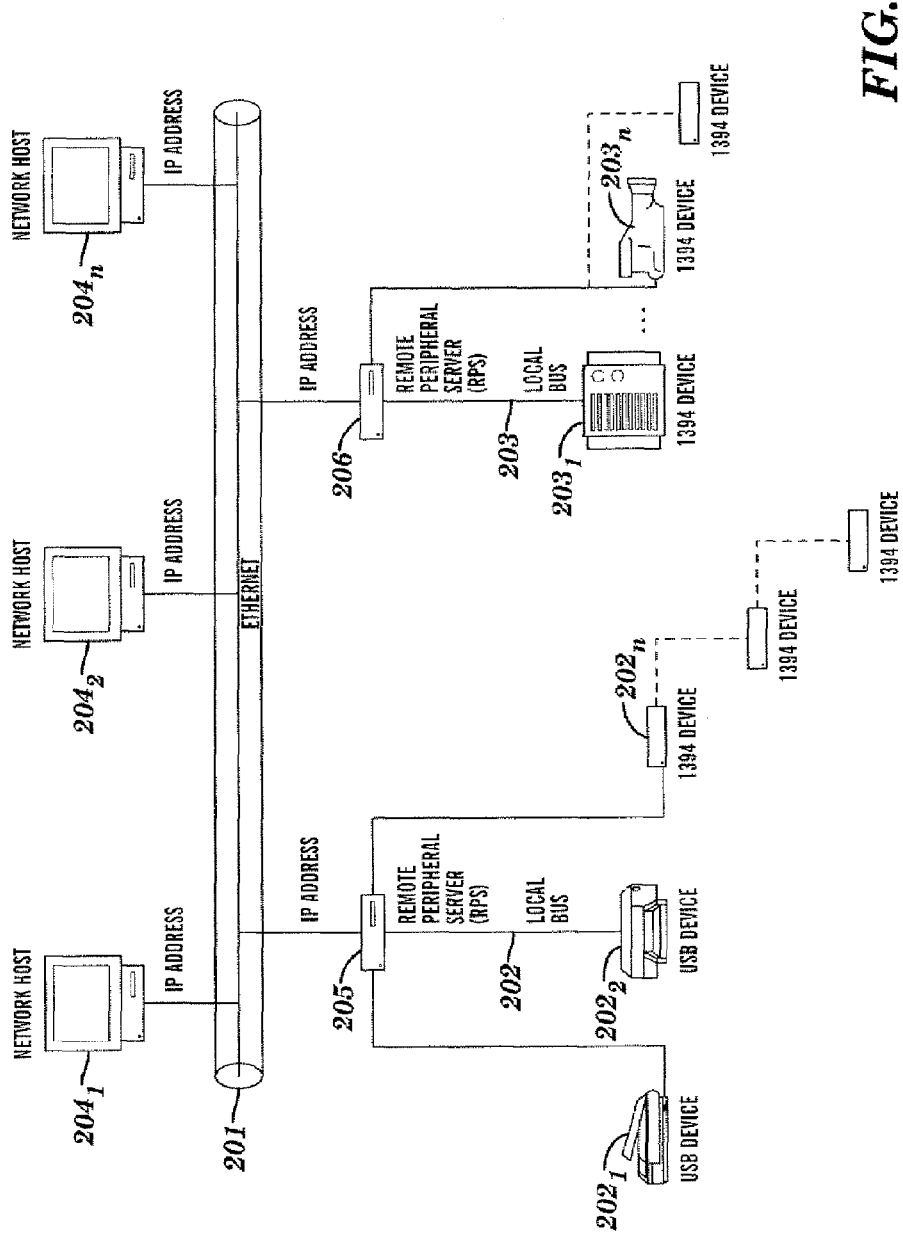
FIG. 1C is a block diagram of one embodiment of a system that employs tunneling between network devices and bus devices.

FIG. 1C is one embodiment of a system that performs the tunneling described herein. Referring to FIG. 1C, a network 201 and two local buses 202 and 203 are coupled together via remote peripheral servers (RPSs) 205 and 206. RPSs 205 and 206 operate as an application level connectivity bridge between network 201 and local buses 202 and 203, respectively. In one embodiment, network 201 is based on IP running on top of Ethernet. In one embodiment, more than two local buses and their respective remote peripheral servers are included in the system. In one embodiment, one or more of the local buses are serial buses (e.g., a IEEE-1394 bus, USB).

It should be noted that RPS 205 and RPS 206 may be no more than small, low cost networking device having a central processing unit (CPU), network ports (e.g., Ethernet ports), device ports (e.g., one or more IEEE-1394 port, one or more USB port, etc.) and memory. In such a case, the CPU runs software to perform the tunneling described herein.

Several network hosts, $204_{1-N}$, are also coupled to network 201. In one embodiment, network hosts $204_{1-N}$ and RPSs 205 and 206 are uniquely identified on network 201 through use of their IP addresses. Each RPS on network 201 connects one or more local buses to the Ethernet network. That is, RPS 205 couples local bus 202 to network 201 and RPS 206 couples local bus 203 to network 201. Each RPS is responsible for encapsulating and decapsulating ("tunneling") all local bus traffic to/from IP packets, and acts as a tunneling endpoint. In the case where the local bus is an IEEE-1394 bus, the RPS involves itself with the packaging/un-packaging of IEEE-1394 transactions into/from IP packets (UDP/TCP), emulation of an IP based networking device to the network host and emulation of an IEEE-1394 initiator (device) to the IEEE-1394 peripheral device.

Any network host, such as network hosts $204_{1-N}$, interested in communicating with devices attached to local buses 202 and 203 also supports the "tunneling" protocol (via software drivers on the network host) described herein, and acts as a tunneling endpoint.

In one embodiment, on each local bus 202 and 203, every device has a invariant globally unique identifier associated with it, as well as a local bus identifier (e.g., an address for USB, a node ID for IEEE-1394). The local bus identifier may change after each bus reconfiguration, but is used for direct addressing of devices on the local bus (either local bus 202 and 203). Each RPS also appears as a local bus just as it appears as a network device. For instance, RPS 205 appears as a device on local bus 202 and a network device on network 201. If local bus 202 is a USB bus, then the RPS 205 would appear as a USB device. If local bus 202 is a 1394 bus, then RPS 205 appears as a 1394 device. It is the responsibility of the RPS to keep an updated "mapping" of globally unique identifiers to local bus identifiers. In one embodiment, this mapping is created via the use of an announcement packet, referred to herein as a RAP packet, which is described below. In one embodiment, all transfers from network hosts to local bus devices (and vice versa) are based on IP addresses (for the network) and globally unique IDs (for the local bus).

In one embodiment, it is possible for devices on one local bus to perform limited communication and data transfers with devices on another local bus, through an IP-based Ethernet network 201. In this case, each RPS performs the role of both an RPS and a network host. The RPS serves as both tunneling endpoints in this case.

Tunneling Transactions

The following description sets forth tunneling for communication between devices on a IEEE-1394 bus and the network. However, these techniques may be applied to other buses and their devices, such as, for instance, but not limited to, USB and USB devices. In one embodiment, software is used to tunnel, or transport, 1394 formatted packets, as specified in the IEEE-1394 (1995), IEEE 1394a or IEEE 1394b specification, or any enhancement to the IEEE 1394 specification thereafter, over Ethernet networks running IP, such as network 201, within an IP packet as specified in the 802.3 specification. The 1394 packet, transaction, or request represents the data portion of the IP packet (e.g., the 1394 packet and tunneling header are inside the TCP or UDP portion of the IP packets). That is, in one embodiment, the IP packet encapsulates the 1394 packet and tunneling header inside of TCP or UDP. By encapsulating the 1394 packets, this software allows 1394 capable devices, whether virtual (i.e., a standard personal computer running software) or physical (attached to a serial bus), to be able to communicate over an IP network. With 1394 tunneling, each 1394 device is capable of communicating with each other over the IP network while preserving their asynchronous or isochronous nature.

The software may be executed on a network host and the RPS. The network host and RPS represent the tunneling endpoints. When any device wants to transfer the 1394 data, whether it be an actual 1394 device or a network host running 1394 applications and drivers, a request is created. The software intercepts the request and creates a new request by encapsulating 1394 specific data and tunneling header inside of UDP or TCP over IP that can be sent over the IP network. In one embodiment, this newly created request is an Ethernet packet. An Ethernet packet is received by a network host or RPS and is decapsulated to obtain the 1394 request, transaction, or packet information enclosed therein. When the 1394 request/transaction data has been obtained, the network host or RPS that decapsulated the Ethernet packet identifies the device for which it is intended and sends the 1394 packet to that particular device.

An address stored in the tunneling data itself indicates the address of the particular device for which the packet is intended. An IP address is used for addressing each individual RPS or network host. The 1394 device address, a device globally unique ID (invariant) for addressing local serial bus address, is inside the tunneling data (inside the TCP or UDP packets).

Thus, the tunneling protocol provides connectivity between a physical RPS and software tunneling drivers running on a network host attached to the network or between two RPS units. These are all tunneling endpoints. This software driver creates a virtual 1394 bus on the network host and uses the networking stacks to communicate with the physical RPS (or another network host with the same tunneling protocol software) located in the network.

In one embodiment, for transfer from the network host to an RPS, the software tunneling driver captures the 1394 requests generated by a 1394 class driver running on the network host and passes them to the network driver. An example of the software is described in more detail below in conjunction with FIG. 2C. The network driver encapsulates the 1394 packets inside of TCP/UDP over IP and attaches a header describing the dynamic characterization of the data. The packets are then sent across the network to the RPS, which unpacks the request and sends it on to the 1394 bus. Data and messages or requests sent from the peripheral (i.e., bus device) back to the network host are encapsulated in IP (over UDP or TCP) packets by the RPS and sent across the network to the network host. The software running on a network host receives the network packets with the network driver, decapsulates the 1394 requests, and passes them to the 1394 driver on the network host. FIG. 2C illustrates an IEEE-1394 tunneling driver and a USB tunneling driver.

When using the IEEE-1394 tunneling driver (redirector), under Windows 98 and Windows 2000, the IEEE-1394 tunneling driver (redirector) loads as a virtual IEEE-1394 Port Driver. Normally an IEEE-1394 Port Driver serves as an interface between the IEEE-1394 Bus Driver and actual IEEE-1394 hardware (registers and DMA interfaces), such as Open HCI based host silicon. The IEEE-1394 tunneling driver (redirector) loads as a virtual IEEE-1394 Port Driver but does not interface with actual IEEE-1394 hardware. Instead, it accepts I/O Request Blocks (IRBs) from the IEEE-1394 Bus Driver, encapsulates the individual IEEE-1394 transactions/requests within TCP or UDP, with a tunneling header, and sends them down the networking stack through use of the TDI Network Interface. All communication between the IEEE-1394 Bus Driver, the TDI Interface to the networking stack, and the IEEE-1394 tunneling driver (redirector) is based on IRPS (I/O Request Packets). IRPs are described in Microsoft's Device Driver Kit (DDK), and are the standard kernel mode method of communicating among drivers under Windows 98, Windows NT, and Windows 2000.

When using the USB tunneling driver (redirector), under Windows 98 and Windows 2000, the USB tunneling driver (redirector) loads as a virtual USB Host Controller Driver (HCD). Normally a USB Host Controller Driver serves as an interface between the USB Bus Driver and actual USB hardware (registers and DMA interfaces), such as OHCI/

UHCI based host silicon. The USB tunneling driver (redirector) loads as a virtual USB Host Controller Driver bus does not interface with actual USB hardware. Instead, it accepts USB Request Blocks (URBs) from the USB Bus Driver, encapsulates them within TCP or UDP, with a tunneling header, and sends them down the networking stack through use of the TDI Interface. All communication between the USB Bus Driver, the TDI Network Interface to the networking stack, and the USB tunneling driver (redirector) is based on IRPs (I/O Request Packets). IRPs are described in Microsoft's Device Driver Kit (DDK), and are the standard kernel mode method of communicating among drivers under Windows 98, Windows NT, and Windows 2000.

The advantage of using the tunneling is that device specific control protocols are passed transparently (to the network host) across the network and appear to the network host as they appear on a local 1394 bus segment. The RPS does not need to know anything about the particular protocol used to communicate between the 1394 class driver, such as, for example, the SBP-2 Class Driver, the DCAM Class Driver, the DVCR Class Driver or the Audio Class Driver, on the network host and the 1394 peripheral connected to the RPS.

In one embodiment, each local bus device, such as devices $202_{1-N}$ or $203_{1-N}$, may only communicate with one network host at a time. This logical connection between the local bus device and the network host is referred to herein as "ownership". Communication between a particular local bus device and a network device occurs in sessions. For each session, the network device exclusively owns the local bus device. When it no longer needs to communicate with the local bus device, it may release the device, then allowing other network hosts to attempt to "own" the device. Ownership is described in greater detail below.

Exemplary Software Protocol Stacks

Referring back to FIG. 1C, it is clear that the network hosts and RPS require specific software to facilitate the tunneling from the network host side, tunneling drivers that transport IEEE-1394 (and/or USB) transactions over the Ethernet IP based network 201 are required, while "virtual" IEEE-1394 (and/or USB) port drivers to support the tunneling of IEEE-1394 (and/or USB) transactions through the networking stack are used. The benefit of performing the tunneling in this manner is to allow remote IEEE-1394 (or USB) peripherals to appear as a local device on network hosts and to each other.

In one embodiment, the tunneling leverages existing Microsoft protocol stacks, while using a 1394 port driver (or HCD in the case of USB) which gives the appearance of a local 1394 bus. The port driver (or HCD) is the lowest level driver which communicates with the hardware. In the case of transfers to the RPS, its connection is to the network, not the 1394 bus.

Therefore, the 1394 port driver (or HCD) redirects transactions, not to a lower level hardware, but to the Microsoft networking stack via the TDI interface, referred to as the NDIS stack.

Figure 2A:
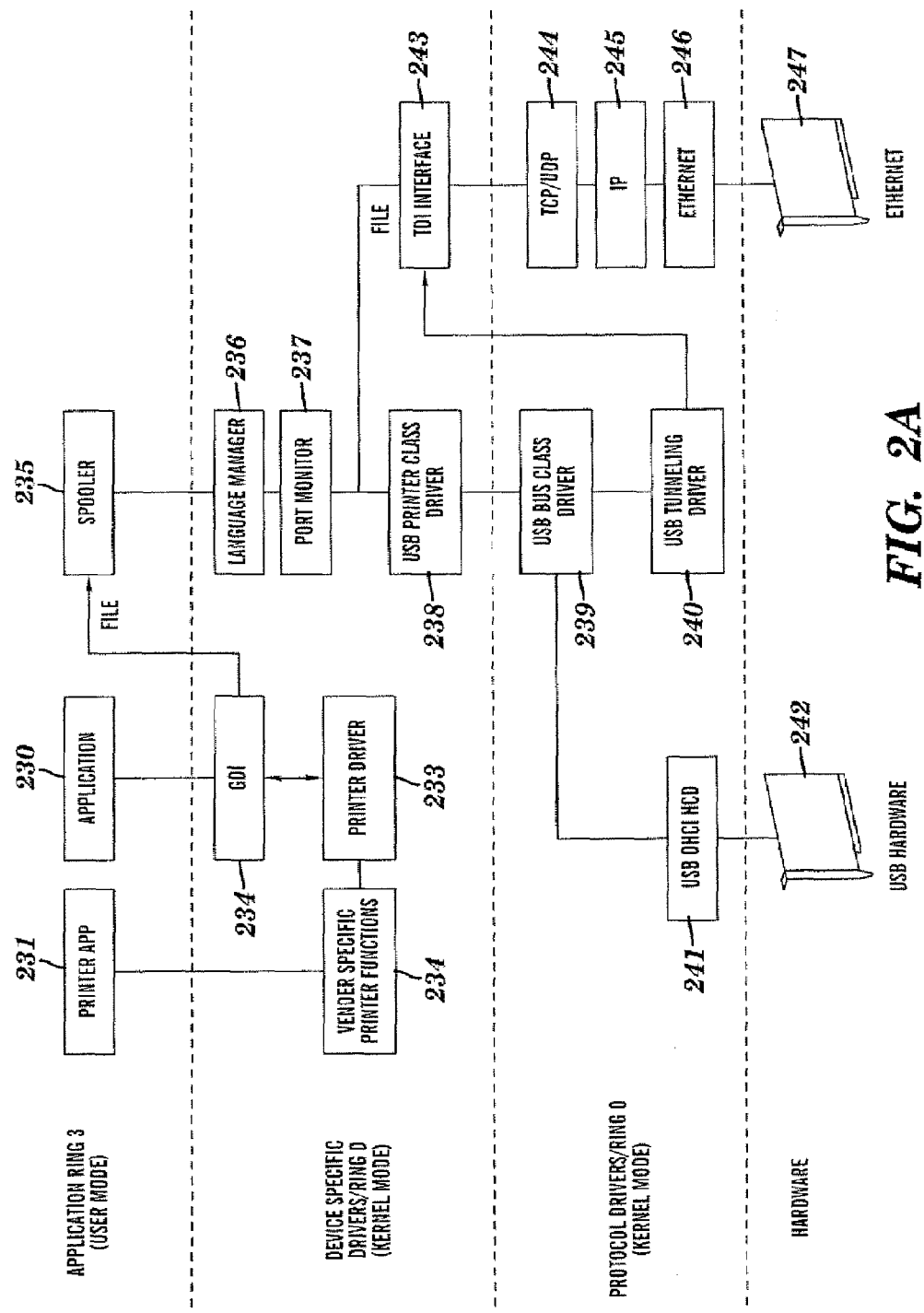
FIG. 2A illustrates an example of operating system redirection.

FIG. 2A illustrates an example of an embodiment of tunneling software included within Windows 98 and Windows 2000 for printing applications. Referring to FIG. 2A, a printer application 231 runs simultaneously with an application 230 running at the application level. The application 230 generates data, or a file, for printing. The application 230 transfers that file to the device specific drivers ring 0 (kernel mode) which forward that file on to a'spooler 235 at the application level using both the printer driver 233 and vender specific printer functions 234. The spooler 235 forwards the file back to the device specific drivers ring 0 (kernel mode) including language manager 236 and port monitor 237. Depending on the application 230, the port monitor 237 may send the file to the network stack (NDIS) 243. However, if the application 230 supports a USB printer, the port monitor 237 will forward the file on to a USB printer class driver 238 which forwards the file on to the protocols drivers ring 0 (kernel mode) level, specifically the bus class driver 239. The USB bus class driver 239 is able to determine if the request is directed for the USB OHCI HCD or the USB Tunneling Driver. If it is meant for the USB OHCI HCD, the USB Bus Driver forwards the file to be printed by the USB hardware 242 via a USB OHCI minidriver 241. If not, the USB tunneling driver redirects the file to the network stack (NDIS 243, TCP 244, IP 245 and Ethernet 246) to be sent over the network via Ethernet card 247.

Figure 2B:
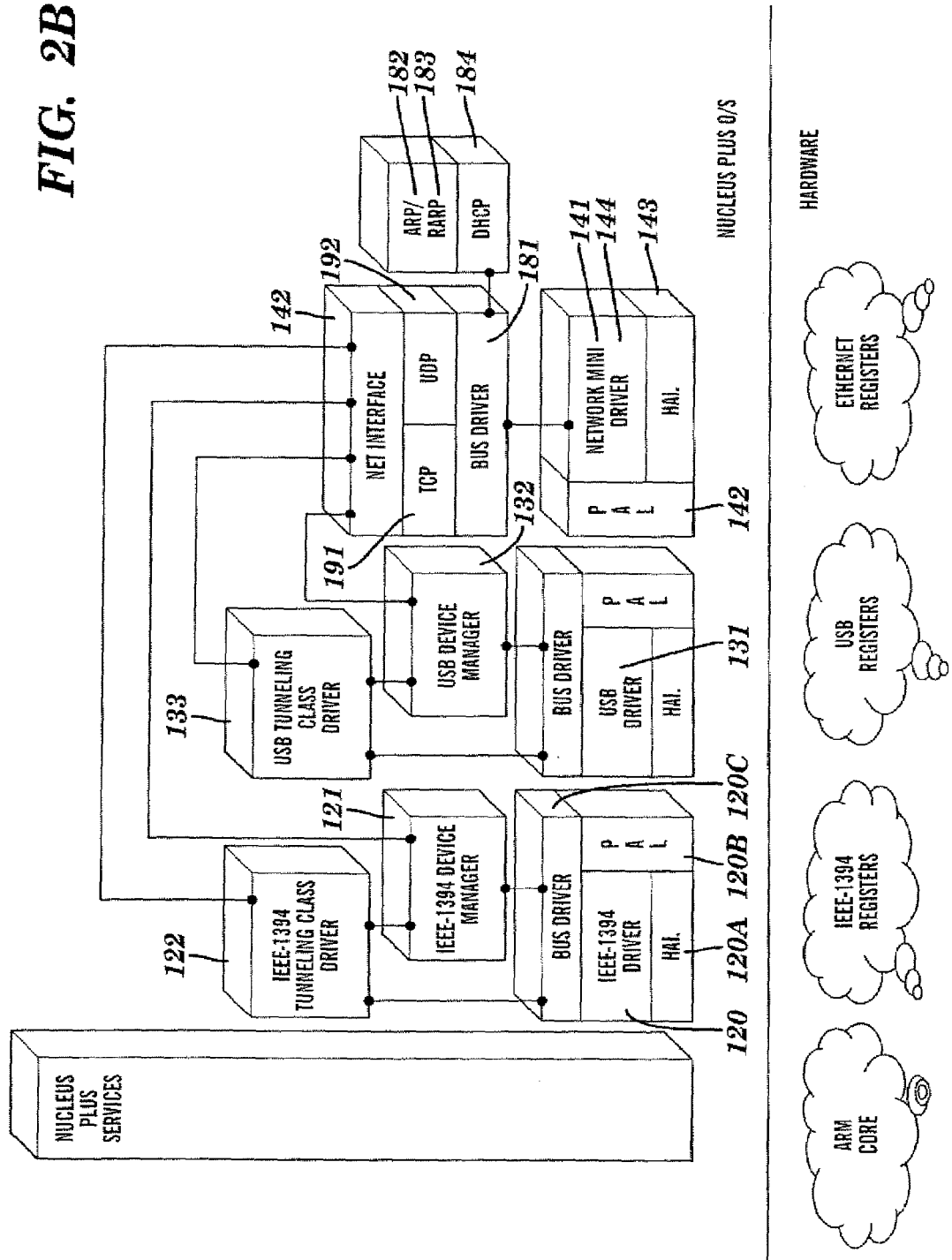
FIG. 2B is one embodiment of a remote peripheral server (RPS) software stack.
Figure 2C:
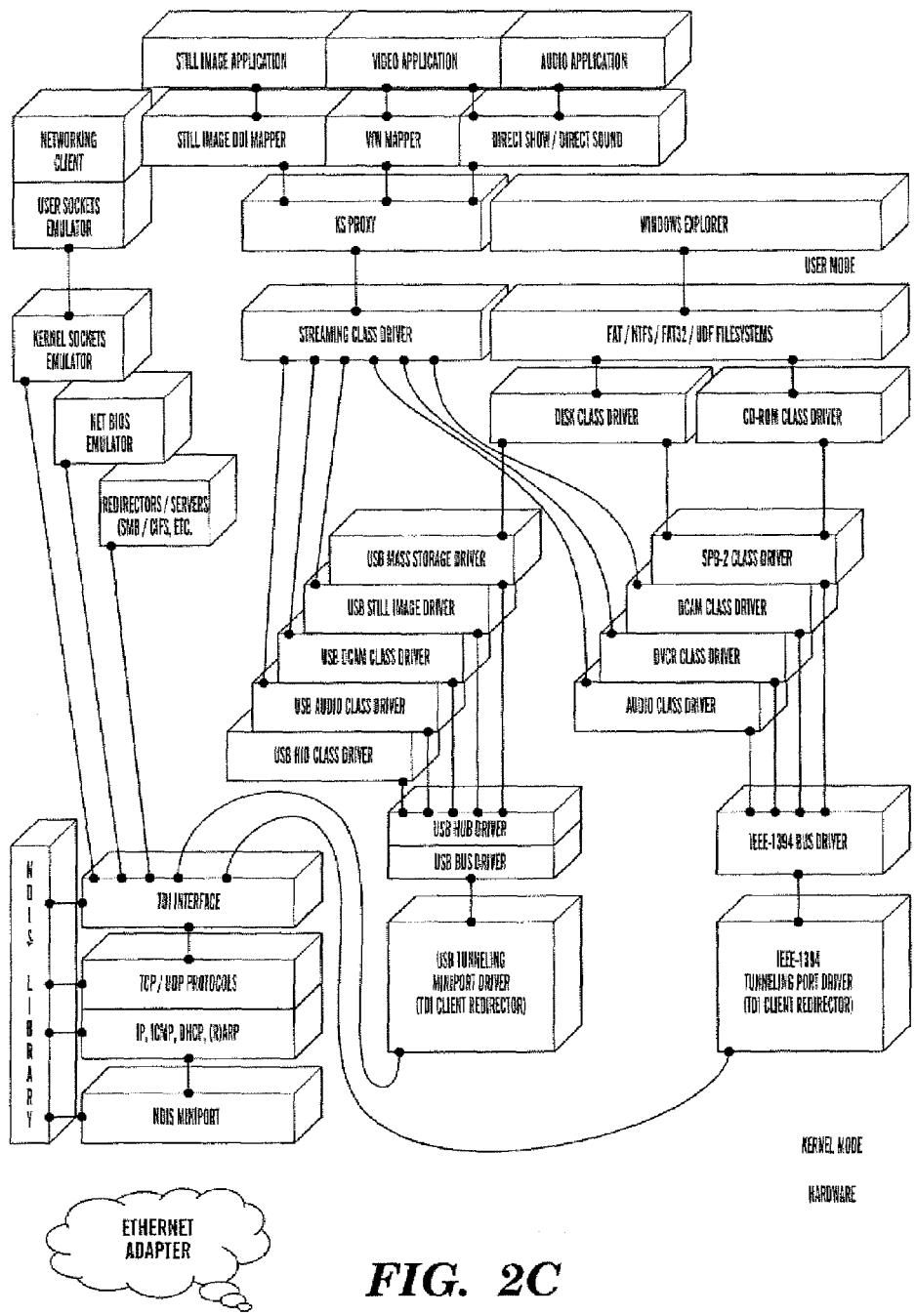
FIG. 2C is one embodiment of a network host software stack.

FIG. 2B illustrates one embodiment of the RPS side software stack for tunneling. Referring to FIG. 2B, a IEEE-1394 driver 120 provides two external interfaces. One interface communicates directly to the IEEE-1394 hardware register set, while the other interface presents an interface similar to Microsoft's IEEE-1394 Bus Driver interface. Driver 120 comprises four parts: a Hardware Abstraction Layer (HAL) component 120A, Platform Abstraction Layer (PAL) component 120B, bus driver component 120C, and IEEE-1394 driver component 120D, all of which operate in a manner well-known in the art.

An IEEE-1394 device manager 121 manages enumeration of devices, node and bus IDs to EUI mapping, and device ownership in a manner well known in the art. Upper level drivers register with device manager 121 in order to obtain a handle to a particular IEEE-1394 device. In one embodiment, device manager 121 is also responsible for periodically broadcasting (or multicasting) IEEE-1394 topology and device ownership information over the network (through the networking stack, using the tunneling protocol) in the form of a RPS Announcement Packet (RAP). In one embodiment, the RPS recognizes a configuration change (e.g., hot insertion, hot withdrawal) and sends a RAP to notify other driver device(s) and/or host(s). Ownership is described in more detail below.

The tunneling class driver 122 handles the packing and unpacking of IP networking packets containing IEEE-1394 transaction level requests. In one embodiment, for asynchronous requests and responses, TCP is used (one request/response per IP packet). For isochronous data, UDP is used, and many isochronous packets can fit into each IP packet. In one embodiment, the packing of isochronous packets with UDP Datagram to increase, and potentially maximize, the efficiency of the network bandwidth and the preservation of isochronous timing characteristics are of particular importance. The RPS may choose to throttle the data based on retrieval bandwidth using protocols such as RSVP or RTP or QOS Network services. One interface of driver 122 is to IEEE-1394 driver 120 and IEEE-1394 device manager 121. Another interface of driver 122 is to the Net Interface 142. The Net interface 142 handles the Ethernet (physical and MAC, LLC), the IP (network layer), and TCP/UDP (transport).

In one embodiment, the RPS software stack includes support for USB devices in which, including a USB driver 131, USB device manager 132 and USB tunneling driver 133, in the same manner as their IEEE-1394 counterparts described above. Such support in the software stack is shown in FIGS. 1B and 1C.

Network Mini Driver 141 provides two external interfaces. In one embodiment, interface of driver 141 communicates directly to the Ethernet hardware register set. Another interface of driver 141 is defined by a networking Application Programming Interface (API). In one embodiment, driver 141 is divided into three parts: PAL component 142, HAL component 143 and Network Minidriver 144, which are all well-known in the art.

An IP component 181, Address Resolution Protocol (ARP) component 182, RARP (Reverse ARP) component 183, and Dynamic Host Configuration Protocol (DHCP) component 184 operate to obtain IP and MAC addresses through standard network services.

A Transmission Control Protocol service component 191 works with IP to ensure the guaranteed delivery of packets to the intended recipient. TCP reassembles the packet sequence, and ensure that all packets have been delivered. A User Datagram Protocol services component 192 works with IP, and is mostly used for broadcast and streaming applications, where guaranteed packet delivery is not a concern. A Net Interface component 142 provides a very simple socket-like API. These components have been provided in the networking stack.

In one embodiment, the network host software stack is shown in FIG. 2C. Referring to FIG. 2C, the host side software stack 160 includes a IEEE-1394 tunneling port driver (TDI client redirector) 161.

IEEE-1394 Tunneling Port Driver (TDI Client Redirector) 161 is virtualized and is responsible for tunneling IEEE-1394 transactions through the networking stack's TDI (Transport Driver Interface).

The network host software stack also includes a TDI Interface, TCP, UPD, IP, ICMP, DHCP, (R)ARP Components, NDIS Miniport Driver, NDIS Library Kernel Mode DLL, Redirectors/Servers (SMB/CIFS, etc.) Components, NetBIOS Emulator Driver, Kernel Mode Sockets Emulator Driver, User Mode WinSOCK Emulator DLL, Networking Client Application, IEEE-1394 Bus Driver, IEEE-1394 DCAM Class Driver, IEEE-1394 SBP-2 Class Driver, SCSI Disk Class Driver, SCSI CD-ROM Class Driver, FAT/NTFS/FAT32/UDF Filesystem Driver, USB Bus Driver, USB Hub Driver, USB HID Class Driver, USB Audio Class Driver, USB DCAM Class Driver, USB Still Image Class Driver, USB Mass Storage Class Driver, Streaming Class Driver, KS Proxy User Mode Driver, Still Image DDI Mapper, Still Image Application, VfW Mapper and Direct Show/Direct Sound. Each of these functions are well known in the art and may be obtained from Microsoft Corporation of Redmond, Wash. is used as part of Windows 2000 and Windows 98.

The Video Application is a video-based application such as, for instance, Microsoft's Netmeeting of Microsoft Corporation of Redmond, Wash. or Adobe Premier of Adobe Corporation. The audio application is an audio application such as Microsoft's Netmeeting or Sound Forge of Sonic Foundaries.

Ethernet Packet Structure

Figure 3A:
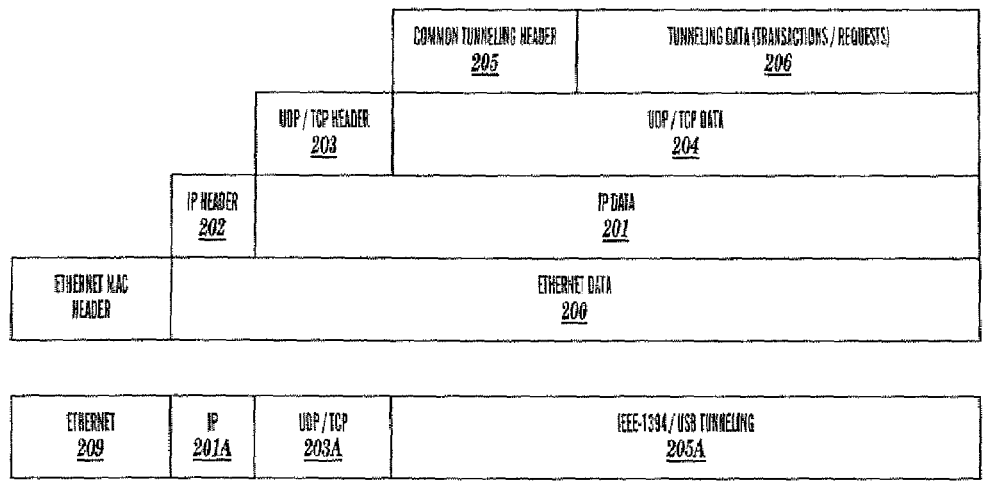
FIG. 3A illustrates layers of encapsulation with Ethernet packets.

FIG. 3A illustrates layers of encapsulation of IEEE-1394 and/or USB information with Ethernet packets. Referring to FIG. 3A, each Ethernet packet 208 contains several layers of encapsulation. IP data 201 and IP header 202 is encapsulated within an Ethernet data 200. Each level of encapsulation contains both header and data portions. Within the IP data 201 is the UDP/TCP header 203 and the UDP/TCP data 204. Similarly, within UDP/TCP data 204 is common tunneling header 205 and tunneling data 206. Tunneling data 206 includes transactions and requests. One definition of the tunneling header 205 and tunneling data 206 of Ethernet packet 208 will be described below in more detail; the other layers are well known to those in the art.

In one embodiment, tunneling relies on the addressing mechanisms built into the IP protocol stack, as well as the packet delivery mechanisms of TCP and UDP. Tunneling uses UDP for multicasts of configuration announcement data (RPS Announcement Packets as described below), as well as for transfers of real-time multimedia data (isochronous data transfers from the local bus). Tunneling uses TCP for all other tunneling requests (including asynchronous data transfers), since the retry mechanism, in order guaranteed delivery, and fragmentation support are necessary.

For purposes of the discussion below, a two byte value is defined as a doublet, a four byte value is defined as a quadlet, and an 8 byte value is defined as an octlet. All structures and definitions set forth herein follow big-ending ordering for byte addresses within a quadlet. For 32-bit (quadlet) structure, byte 0 is always the most significant byte for purposes of this discussion.

Figure 3B:
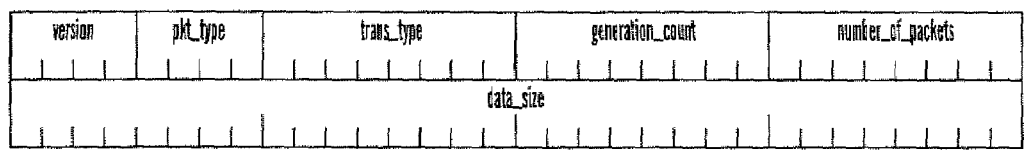
FIG. 3B illustrates one embodiment of a common tunneling header.

As described above, each tunneled request includes both a common tunneling header 205 and tunneling data portion 206. In one embodiment, tunneling data portion 206 is specific to each tunneling packet type and tunneling transaction type. FIG. 3B illustrates one embodiment of a common tunneling header. In one embodiment, each of the fields of the common tunneling header of FIG. 3B is defined as follows:

| Field | Size | Description |
| --- | --- | --- |
| version | 4 | This field indicates the version of the tunneling protocol being used. The upper two bits represent the version, and the lower two bits represent the revision.<br>0100 = Version 1, Revision 0 |
| pkt_type | 4 | This field indicates the type of packet the header represents.<br>000b = Control Packet<br>0001b = IEEE-1394 Tunneled Packet<br>0011 = Ownership Packet<br>0100b-1111b = Reserved |
| trans_type | 8 | This field indicates a specific transaction/request type for a particular packet type (qualified by pkt_type).<br>IEEE-1394 Tunneled Packet<br>00h = RPS Announcement packet (RAP)<br>01h = Asynchronous Data Packet<br>02h = Isochronous Data Packet<br>03h = Allocate Isochronous Resources Request<br>04h = Allocate Isochronous Resources Response<br>05h = Free Isochronous Resources Request<br>06h = Free Isochronous Resources Response<br>07h = Begin Isochronous Data Transfer<br>08h = Stop Isochronous Data Transfer<br>09h = Isochronous Data Confirmation<br>0Ah = Bus Configuration Request<br>0Bh = RAP Announcement Packet (RAP) Request<br>Ownership Packet<br>00h = Query Owner Request<br>01h = Query Owner Response<br>02h = Register Ownership Request<br>03h = Register Ownership Response<br>04h = Release Ownership Request<br>05h = Release Ownership Response<br>06h = Ownership Ping Request<br>07h = Ownership Ping Response |

-continued

| Field | Size | Description |
| --- | --- | --- |
| generation_count | 8 | This field indicates the current local "generation" of the local serial bus being tunneled. Every time a local serial bus con-configuration change occurs, the local generation is incremented by one. By sending the "generation" with each re-quest tunneled, each member of the tunneled network is made aware of any local serial bus configuration changes. "Stale" request (requests made before knowledge of a serial bus configuration change) may also be handled with this mechanism by comparing the local "generation " with the incoming packet's known "generation" . |
| number_of packets | 8 | This field indicates the number of packets of a single type concatenated together within an TCP/IP or UDP/IP payload. This payload may or may not be fragmented in the case of TCP/IP. Only a single Common Tunneling Header is included in this payload. In the particular case of IEEE-1394 Tunneled Pac-ets, several Isochronous Data Packets and Asynchronous Data Packets will often be concatenated together. The number_of _packets field would be a total count of these data packets. |
| data_size | 32 | This field represents the total size in bytes of the data being tunneled, including the Common Tunneling Header itself. |

Tunneling data portion 206 follow immediately after common tunneling header 205. In one embodiment, tunneling data portion 205 is specific to each tunneling packet type and tunneling transaction type. In one embodiment, some of the tunneling packets are encapsulated within UDP, and some are encapsulated within TCP. Note that alternate network protocols may be used. For example, RTP/RTCP may be used in the future (on top of UDP).

Following are descriptions of IEEE-1394 Tunneled Packets, as defined by the packet type in the common tunneling header 205. These include RPS Announcement Packet (RAP), Asynchronous Data Packet, Isochronous Data Packet, Allocate Isochronous Resources Request, Allocate Isochronous Resources Response, Free Isochronous Resources Request, Free Isochronous Resources Response, Begin Isochronous Data Transfer, Stop Isochronous Data Transfer, Isochronous Data Confirmation, Bus Configuration Request and RPS Announcement Packet (RAP) Request.

1) RPS Announcement Packet (RAP). When an RPS (e.g., RPS 205, RPS 206 of FIG. 1C, etc.) is first plugged into the network and has been configured (allocated an IP address, etc.), it announces itself by sending a special NETBIOS server announcement to the master browser every minute. In alternate embodiments, other time intervals may be used. In one embodiment, the time between server announcements is slowly increased until the interval becomes once every 12 minutes, though this is not a requirement of the techniques and methods described herein.

Along with the NETBIOS announcement, the RPS sends a multicast UDP packet containing an RPS Announcement Packet (RAP) which is received by interested network hosts. In one embodiment, this announcement contains information about the RPS, the local bus, devices attached to the local bus, and device ownership.

In one embodiment, the RPS also sends a RAP multicast anytime there is a configuration change on the local bus (a bus reset for IEEE-1394) or if it receives a RAP request from a network host. This allows network hosts to be notified of configuration changes without having to individually poll each RPS periodically for configuration changes.

Figure 4:
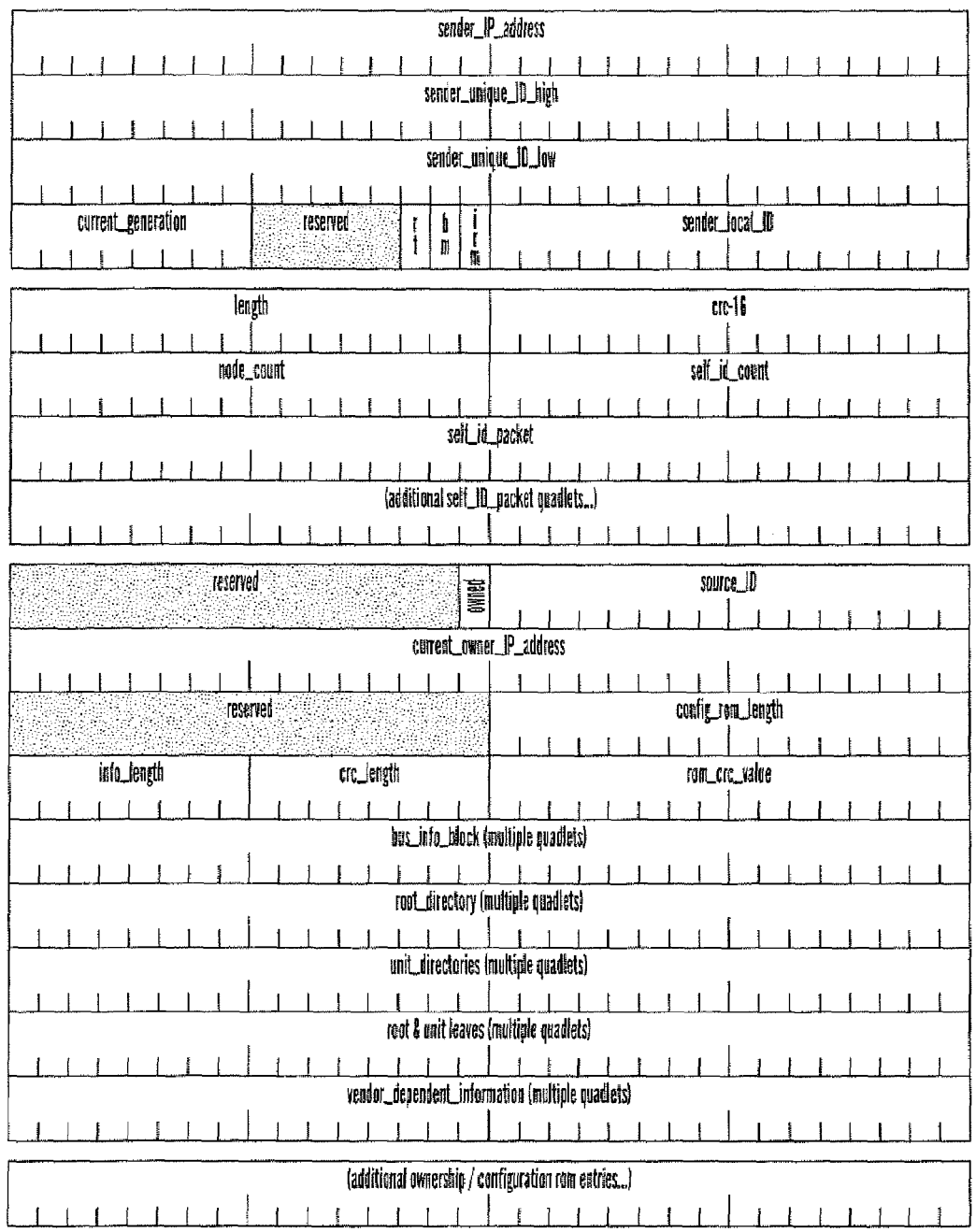
FIG. 4 illustrates one embodiment of the RAP Announcement (RAP) multicast format.

FIG. 4 illustrates one embodiment of the RAP Announcement (RAP) multicast format. In one embodiment, each of the fields of a RAP announcement multicast format are as follows:

| Field | Size | Description |
| --- | --- | --- |
| sender_IP_address | 32 | This field represents the IP address of the source of the RAP. In most cases this address will be identical to the IP source address of the actual IP packet, but in cases where a "proxy" is used (as in the case of a unicast server), these addresses may differ. |
| sender_unique_ID-high | 32 | This field represents the IEEE-1394 EUI-64 (Extended Unique Identifier) of the IEEE-1394 RPS node responsible for the RAP. This is the field that holds the upper 32 bits of the EUI-64. |
| sender_unigue_ID-low | 32 | This field holds the lower 32 bits of the EUI-64. |
| current_generation | 8 | This field holds the current generation count of the IEEE-1394 bus. |
| rt | 1 | This field indicates whether the IEEE-1394 RPS node is the Root of its local bus. 0b = Not Root of local bus 1b = Bus Manager of local bus |
| bm | 1 | This field indicates whether the IEEE-1394 RPS node is the Bus Manager of its local bus. 0b = Not Bus Manager of local bus 1b = Bus Manager of local bus |
| irm | 1 | This field indicates whether the IEEE-1394 RPS node is the Isochronous Resource Manager of the local bus. 0b = Not Isochronous Resource Manager of local bus 0b = Isochronous Resource Manager of local bus |
| sender_local_ID | 16 | This field indicates the local ID (bus number concatenated with node ID) of the IEEE-1394 RPS node. |
| length | 16 | This field specifies the number of following quadlets in the topology map. |
| crc-16 | 16 | This field covers all of the following quadlets of the topology map. |
| node_count | 16 | This field specifies the total number of local nodes found on the bus. |
| self_id_count | 16 | This field represents a copy of each self-ID packet saved in the topology map. There will be self _id_count number of these fields containing copies of self_ID packets. |
| owned | 1 | This field indicates whether the IEEE-1394 device described beneath (Configuration ROM) currently has a network host owner associated with it. 0b = There is no owner currently specified for this device. 1b = There is an owner currently specified for this device. |
| source_ID | 16 | This field contains the local ID (bus number concatenated with node ID) of the IEEE-1394 device described beneath (Configuration ROM). |
| current_owner_IP_address | 32 | This field contains the IP address of the network host owner of this IEEE-1394. |

| Field | Size | Description |
| --- | --- | --- |
| config_rom_length | 16 | This field specifies the number of following quadlets in the IEEE-1394 device's Configuration ROM that follows. |
| info_length | 8 | This is the info_length field of the Configuration ROM entry for this IEEE-1394 device. |
| crc_length | 8 | This is the crc_length field of the Configuration ROM entry for this IEEE-1394 device. |
| rom_crc_value | 16 | This is the rom_crc_value of the Configuration ROM entry for this IEEE-1394. |
| bus_info_block | — | This is the bus_info_block of the Configuration ROM entry for this IEEE-1394 device. It is two quadlets in length, and contains the IEEE-1394 signature and node capabilities. |
| root_directory | — | This is the root_directory of the Configuration ROM entry for this IEEE-1394 device. It is multiple quadlets in length, and contains the Node Unique ID entry (EUI-64) of the node. |
| unit_directories | — | This field contains the unit directories of the Configuration ROM entry for this IEEE-1394 device. |
| root & unit leaves | — | This field contains root and unit leaves of the Configuration ROM entry for this IEEE-1394 device. |
| vendor_dependent_info | — | This field contains the vendor dependent info of the Configuration ROM entry for this IEEE-1394 device. |

2) Asynchronous Data Packet. Either the RPS or the network host may send an asynchronous data packet. This data packet encapsulates all IEEE-1394 primary asynchronous requests and responses. In one embodiment, this packet is transported through the use of TCP and is addressed to either a network host or RPS through use of an IP address.

In one embodiment, the source and destination unique IDs represent actual local bus devices. In the case of a network host sending a packet to a particular IEEE-1394 device, the destination ID would be the EUI-64 of the device itself, and the source ID would be undefined (e.g., set to FFFFFFFFh). In the case of the IEEE-1394 local device, sending a packet to a network host, the destination ID would undefined (e.g., set to FFFFFFFFh), and the source ID would be the EUI-64 of the IEEE-1394 device itself. If an IEEE-1394 local device is sending a packet to an IEEE-1394 local device across the network (RPS to RPS tunneling), the source and destination unique IDs would be the EUI-64 values of the source and destination IEEE-1394 devices respectively.

Figure 5:
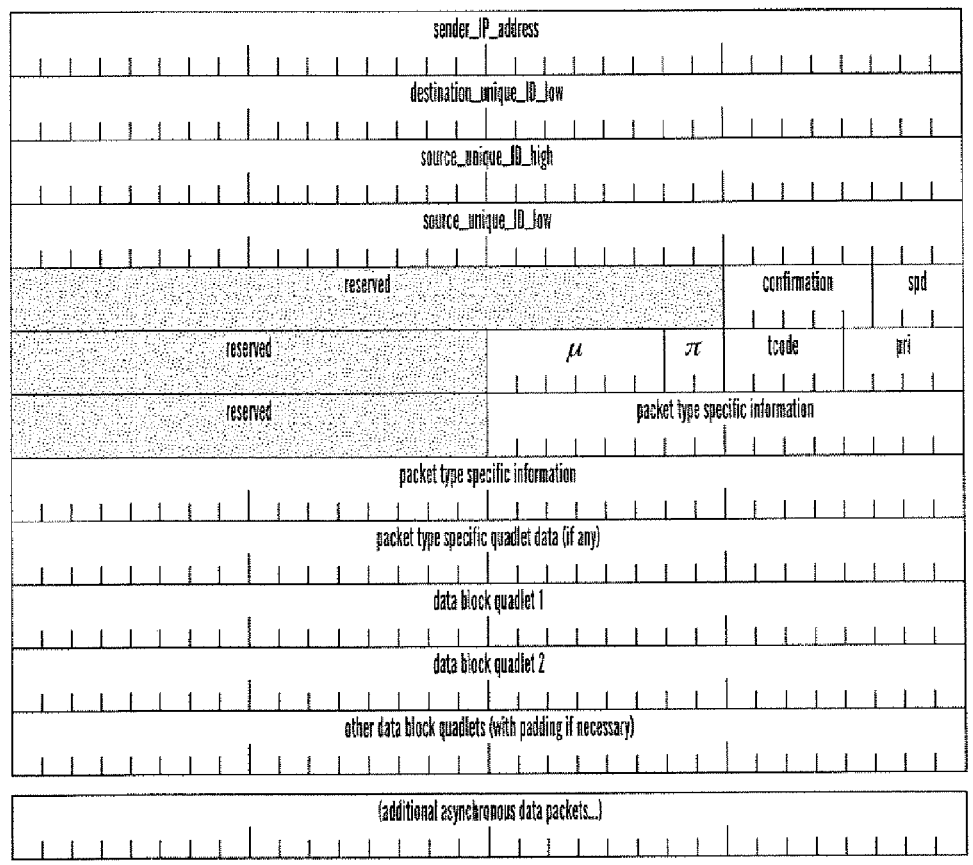
FIG. 5 is one embodiment of the Asynchronous Data Packet format.

FIG. 5 is one embodiment of the Asynchronous Data Packet format. Each of the fields of one embodiment of the asynchronous data packet format of FIG. 5 are described below. Note that the confirmation field is used as indicate the "posted" immediate response (ack code). In the case of write requests, by "posting" an ack_complete, a split transaction may be prevented from going over the Ethernet network.

| Field | Size | Description |
| --- | --- | --- |
| destination_unique_ID_high | 32 | This field represents the IEEE-1394 EUI-64 (Extended Unique Identifier) of the IEEE-1394-destination node for this request. This is the field that holds the upper 32 bits of the EUI-64. If the destination is a network host, then this field is undefined and set to FFFFFFFFh. |
| destination_unique_ID_low | 32 | This field holds the lower 32 bits of the EUI-64 |
| source_unique_ID_high | 32 | This field represents the IEEE-1394 EUI-64 Extended Unique Identifier) of the IEEE-1394 source node for this request. This is the field that holds the upper 32 bits of the EUI-64. If the source is a network host, then this field is undefined and set to FFFFFFFFh. |
| source_unique_ID_low | 32 | This field holds the lower 32 bits of the EUI-64 |
| confirmation | 5 | This field holds the "posted" acknowledge code reported by the source of the packet (immediate response to a non-broadcast primary packet). This is needed because immediate responses cannot be tunneled across a network. The "posted" acknowledge code will specify whether the request is a unified or split transaction. Ack codes are identical to those specified in the IEEE-1394-1995 specification (and IEEE-1394A supplement). |
| spd | 3 | This field specifies the speed at which the packet is to be transmitted over the IEEE-1394 bus.<br>000b = Send packet at 100 mb/s rate<br>001b = Send packet at 200 mb/s rate<br>010b = Send packet at 400 mb/s rate<br>011b = Send packet at 800 mb/s rate<br>100b = send packet at 1,600 mb/s rate<br>101b = Send packet at 3,200 mb/s rate<br>111b = Send packet at rate determined by IEEE-394 RPS node |
| tl | 6 | This field represents the transaction label for the IEEE-1394 asynchronous request. |
| rt | 2 | This field represents the retry code for the IEEE-1394 asynchronous request. |
| tcode | 4 | This field represents the transaction code for the IEEE-1394 asynchronous request |
| pri | 4 | This field represents priority for the IEEE-1394 asynchronous request. |
| other fields | — | Other fields are specific to the type of IEEE-1394 asynchronous request being made. Header and data CRC fields are not included in the request. |

3) Isochronous Data Packet. Either an RPS or a network host may send an isochronous data packet. In one embodiment, this packet is transported through use of UDP (as opposed to TCP) and is addressed to either a network host or RPS through use of an IP address. UDP is used in order to save in overhead, prevent retries of delivery (isochronous data should not be confirmed), and for its ability to support several listeners to an isochronous stream.

In one embodiment, several isochronous packets are concatenated together in order to make network traffic more efficient. These concatenated isochronous data packets are all from a single stream (single channel number) and only one common tunneling header is included at the beginning of the tunneling packet. The determination of where and how to concatenate may be based on the maximum Ethernet packet size (about 1500 bites), isochronous packet sizes, and the latency (as defined in the Isochronous Allocate Resources Request described below).

In one embodiment, the "ind" bits in the tunneling packet are used for flow/rate control of isochronous data from a network host to an RPS. The RPS sends isochronous data over the IEEE-1394 bus at a constant 8000 packets per second rate. The "ind" bits specify when a "confirmation" packet should be sent from the RPS back to the network host, so that the network host may properly manage flow/rate control (where, for instance, the transfer rate from the network host to the RPS is supposed to be equal to the transfer rate of data from the RPS over the IEEE-1394 bus).

Figure 6:
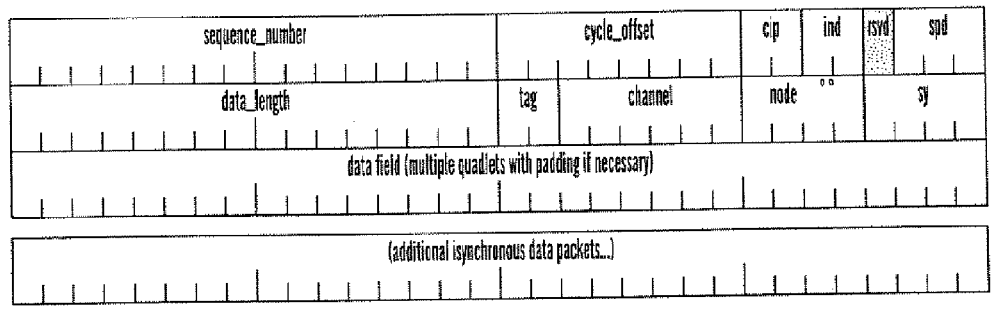
FIG. 6 is one embodiment of the Isochronous Data Packet format.

FIG. 6 is one embodiment of the isochronous data packet format. Each of the field definitions for one embodiment of the Isochronous Data packet format is given below.

| Field | Size | Description |
| --- | --- | --- |
| sequence_number | 16 | This field serves two purposes. The sequence number is sequentially incremented (mod 65536) by one for each Isochronous Data Packet sent by either the network host or the RPS. It is used by the receiver to determine if any isochronous packets have been "lost" over the network (Isochronous Data Packets are encapsulated within UDP). This field also represents a "handle" or "context" that is to be returned in a Isochronous Data confirmation packet, based on the ind field, and sent when the isochronous data packet has been successfully transmitted on the local IEEE-1394 bus. |
| cycle_offset | 8 | This field represents an offset to be added to the transmit time on the IEEE-1394 bus and inserted in the SYT and/or SPH field within a CIP (Common Isochronous Packet) based isochronous packet, bused on the CIP field. |
| cip | 2 | This field specifies if the current transmit time plus cycle offset should be inserted into the SYT field and/or SPH fields on a CIP based packet. The cycle offset is added to the cycle count field within IEEE-1934 cycle time.<br>00b = Do not modify SYT or SPH fields.<br>01b = Insert transmit cycle time plus offset into the SYT field<br>10b = Insert transmit cycle time plus offset into the SPH field<br>11b = Insert transmit cycle time plus offset into both the SYT and SPH fields. |
| ind | 2 | This field specifies if an Isochronous Data Confirmation packet should be returned after this isochronous data has been transmitted on the local IEEE-1394 bus.<br>00b = Do not send a confirmation packet.<br>01b = Send a confirmation packet, containing the sequence_number<br>10b = Send a confirmation packet, containing both the sequence_number and the actual transmit time of the isochronous packet. |

-continued

| Field | Size | Description |
| --- | --- | --- |
| | | 11b = Send a confirmation packet, containing the sequence_number, actual transmit time, and offset (cycle count) from the SYT/SPH field in the CIP. |
| spd | 3 | This field specifies the speed at which the packet is to be transmitted over the IEEE-1394 bus.<br>000b = Send packet at 100 mb/s rate<br>001b = Send packet at 200 mb/s rate<br>010b = Send packet at 400 mb/s rate<br>011b = Send packet at 800 mb/s rate<br>100b = Send packet at 1,600 mb/s rate<br>101b = Send packet at 3,200 mb/s rate<br>111b = Send packet at rate determined by IEEE-1394 Rb'S node |
| data_length | 16 | This field represents the data length of the isochronous packet, as described in the IEEE-1394-1995 specification (and IEEE 1394A supplement.) |
| tag | 2 | This field represents the tag of the isochronous packet, as described in the IEEE-1394-1995 specification (and IEEE-1394A supplement). This field represents the channel of isochronous packet, as described in the IEEE 1394-1995 specification (and IEEE-1394A supplement.) |
| channel | 6 | This field represents the channel of isochronous packet, as described in the IEEE 1394-1995 specification (and IEEE-1394A supplement.) |
| tcode | 4 | This field represents the channel of the isochronous packet, as described in the IEEE-1394-1995 specification (and IEEE-1394A supplement). For isochronous packets, the specified tcode is Ah. |
| sy | 4 | This field represents the sync of the isochronous packet, as described in the IEEE-1394-1995 specification (and IEEE-1394A supplement) |
| data field | — | This field holds the data isochronous portion of the packet. It may be many quadlets in length with or w/o padding). |

4) Allocate Isochronous Resources Request. A network host may send an allocate isochronous resources request packet to prepare an RPS for reception/transmission of an isochronous data stream. In one embodiment, this packet is transported through use of TCP and is addressed to the RPS through use of an IP address. The RPS uses the information contained in this request to allocate hardware resources, ensure that there is available channels and bandwidth on the local IEEE-1394 bus, and potentially use RSVP, RTP and RTCP to help ensure adequate network bandwidth and network delay for the stream. An allocate isochronous resources request is also used to determine how many Isochronous packets to concentrate together in an Ethernet frame.

Figure 7:
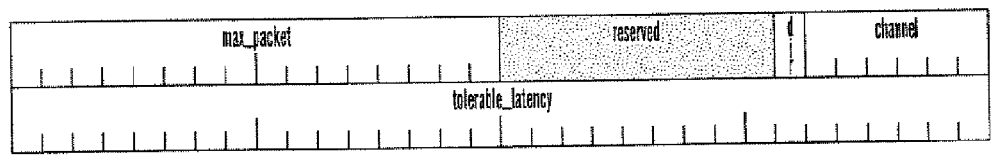
FIG. 7 is one embodiment of the Allocate Isochronous Resources Request format.

FIG. 7 is one embodiment of the Allocate Isochronous Resources Request format. Exemplary field definitions for the embodiment of the allocate isochronous resources request shown in FIG. 7 is given below.

| Field | Size | Description |
| --- | --- | --- |
| max_packet_size | 16 | This field specifies in bytes the maximum sized isochronous packet to be transmitted on the IEEE-1394 bus for this channel. Multiplying this number and 8000 gives a worst case throughput requirement for the channel. |
| dir | 1 | This field specifies whether data is to be transmitted or received by the IEEE-1394 RPS node on the local IEEE-1394 bus. |

-continued

| Field | Size | Description |
|---|---|---|
| | | 0b = Isochronous data is to be received by the RPS node<br>1b = Isochronous data is to be transmitted by the RPS node |
| channel | 6 | This field specifies the IEEE-1394 isochronous channel that the data transfer will occur on. |
| tolerable_latency | 32 | This field specifies the maximum latency allowable between the time when a packet is received from the network and the time when it is transmitted on the local IEEE-1394 local bus (or vice versa). This field is specified in IEEE-1394 cycles. If a value of FFFFFFFFh is specified, then it is up to the RPS node to determine an appropriate latency. |

5) Allocate Isochronous Resources Response. The RPS sends an allocate isochronous resources response packet after receiving an allocate isochronous resources request packet. This packet contains the status of the resources request. In one embodiment, this packet is transported through use of TCP and is addressed to the network host through use of an IP address.

Figure 8:
FIG. 8 is one embodiment of the Allocate Isochronous Resources Response format.

FIG. 8 is one embodiment of the Allocate Isochronous Resources Request format. Exemplary field definitions for the one embodiment of the allocate isochronous resource request packet shown in FIG. 8 is given below.

| Field | Size | Description |
|---|---|---|
| allocation_status | 8 | This field represents the isochronous resource allocation status returned after receiving an Allocate Isochronous Resources Request.<br>00h = Allocation successful<br>01h = IEEE-1394 hardware resources not available<br>02h = IEEE-1394 bandwidth not available<br>03h = IEEE-1394 channel not available<br>04h = Network bandwidth is not available<br>05h = Maximum latency requirements cannot be met<br>06h-FFh = Reserved |
| channel | 6 | The field represents the channel specified in the Allocate Isochronous Resources Request. |

6) Free Isochronous Resources Request. The network host may send a free isochronous resources request packet. This is sent to deallocate resources associated with an isochronous stream. In one embodiment, this packet is transported through use of TCP and is addressed to the RPS through use of an IP address. The RPS uses the channel number contained in this request to free hardware resources and free any RSVP bandwidth allocated for the isochronous stream.

Figure 9:
FIG. 9 is a description of one embodiment of the Free Isochronous Resources Request format.

FIG. 9 is a description of one embodiment of the Free Isochronous Resources Request format. The field definition for the embodiment of the free isochronous resources request format shown in FIG. 9 is described below.

| Field | Size | Description |
|---|---|---|
| channel | 6 | This field represents the isochronous channel that resources should be released for. |

7) Free Isochronous Resources Response. The RPS sends a free isochronous resources response after receiving a free isochronous resources request. This is sent to notify the network host that resources have been successfully deallocated. In one embodiment, this packet is transported through use of TCP and is addressed to the network host through use of an IP address.

Figure 10:
FIG. 10 is one embodiment of the Free Isochronous Resources Response format.

FIG. 10 is one embodiment of the Free Isochronous Resources Request format. Each of the fields for the free isochronous resources request format shown in FIG. 10 is given below.

| Field | Size | Description |
|---|---|---|
| status | 8 | This field represents the status of the Free Isochronous Resources Response.<br>00h = Resources freed successfully<br>01h = Resources were not previously allocated for this channel<br>02h = Resources could not be freed for this channel<br>03h = Ffh = Reserved |
| channel | 6 | This field represents the isochronous channel that resources were released for. |

8) Begin Isochronous Data Transfer. The network host may send a begin isochronous data transfer packet. This is sent to notify the RPS that it should begin transmitting or receiving isochronous data from its local IEEE-1394 device (based on channel number). In one embodiment, this packet is transported through use of TCP and is addressed to the RPS through use of an IP address.

Figure 11:
FIG. 11 is one embodiment of the Begin Isochronous Data Transfer format.

FIG. 11 is one embodiment of the Begin Isochronous Data Transfer format. Each of the fields for the begin isochronous data transfer format of FIG. 11 are described below.

| Field | Size | Description |
|---|---|---|
| dir | 1 | This field specifies whether data is to be transmitted or received by the IEEE-1394 RPS node on the local IEEE-1394 bus.<br>0b = Isochronous data is to be received by the RPS node<br>1b = Isochronous data is to be transmitted by the RPS node |
| channel | 6 | This field specifies which IEEE-1394 isochronous channel should start transmitting or receiving data. |

9) Stop Isochronous Data Transfer. The network host may send a stop isochronous data transfer packet. This is sent to notify the RPS that it should stop transmitting or receiving isochronous data from its local IEEE-1394 device (based on channel number). In one embodiment, this packet is transported through use of TCP and is addressed to the RPS through use of an IP address.

Figure 12:
FIG. 12 is one embodiment of the Stop Isochronous Data Transfer format.

FIG. 12 is one embodiment of the stop isochronous data transfer format. The field of the Stop Isochronous Data Transfer format of FIG. 12 is given below.

| Field | Size | Description |
|---|---|---|
| channel | 6 | This field specifies which IEEE-1394 isochronous channel should stop transmitting or receiving data. |

10) Isochronous Data Confirmation. In one embodiment, the RPS sends an isochronous data confirmation packet in response to actual transmission/reception on the local IEEE-1394 bus of a particular isochronous data packet (as specified by the ind bit). In one embodiment, this packet is transported through use of TCP and is addressed to the network host through use of an IP address. This confirmation packet is used for synchronization and flow/rate control of isochronous data, since network hosts do not have a built in flow/rate control mechanism for transmission of isochronous data over the Ethernet network.

Figure 13:
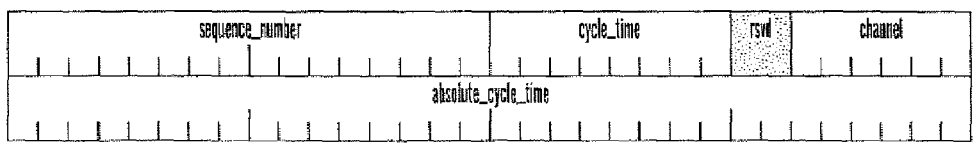
FIG. 13 is one embodiment of the Isochronous Data Confirmation format.

FIG. 13 is one embodiment of the Isochronous Data Confirmation format. Each of the fields of the isochronous data confirmation format of FIG. 13 is described below.

| Field | Size | Description |
| --- | --- | --- |
| sequence_number | 16 | This field represents the sequence number "context" specified in the Isochronous Data Packet. It is returned in this packet in order to allow the matching of Isochronous Data Packets and Isochronous Data Confirmations. |
| cycle_offset | 8 | This field represents the cycle offset (from cycle count) of the actual transmit time from the SYT/SPH fields in the CIP. This validity of this field is based on the value of the ind field in the Isochronous Data Packet request. |
| channel | 6 | This field represents the IEEE-1394 isochronous channel number that this confirmation is for. |
| absolute_cycle_time | 8 | The field represents the actual transmit time of the isochronous data on the IEEE-1394 local bus. This validity of this field is based on the value of the ind field in the Isochronous Data Packet. |

11) Bus Configuration Request. The network host may send a bus configuration request to an RPS. In one embodiment, this packet is transported through use of TCP and is addressed to the RPS through use of an IP address. This configuration request is used to either manually generate a bus reset or send a phy configuration packet on the local IEEE-1394 bus. In one embodiment, it is only used by a network host under special circumstances (catastrophic error recovery, local bus optimization, etc.).

Figure 14:
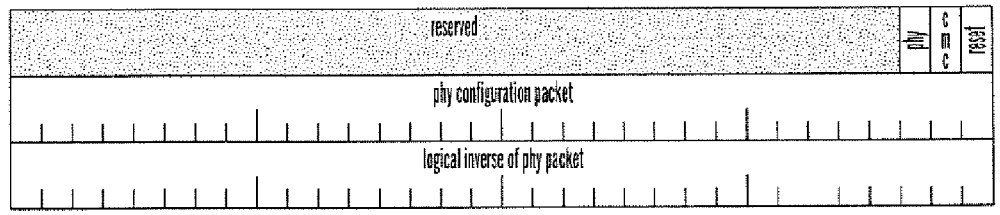
FIG. 14 is an embodiment of the Bus Configuration Request.

FIG. 14 is an embodiment of the Bus Configuration Request. Each of the fields of the bus configuration request format of FIG. 14 is given below.

| Field | Size | Description |
| --- | --- | --- |
| phy | 1 | This field indicates whether to send a phy configuration packet out on the local IEEE-1394 bus. This phy packet could be send in association with a bus reset. |
| cmc | 1 | This field indicates whether to contend for local bus manager. It is only set in conjunction with the reset bit.<br>0b = Do not contend for local bus manager<br>1b = Contend for local bus manager |
| reset | 1 | This field indicates whether a bus reset should be performed on the local IEEE-1394 bus. It may be done in conjunction with contending for local bus manager and/or sending a phy config packet.<br>0b = Do not initiate a bus reset<br>1b = Initiate a bus reset |

-continued

| Field | Size | Description |
| --- | --- | --- |
| phy config packet | 32 | This field represents the phy config packet to be sent on the local IEEE-1394 bus, if the phy field bit is set. |
| inverse | 32 | This field is the bit-wise inverse of the phy config packet. |

12) RPS Announcement Packet (RAP) Request. The network host may send an RPS Announcement Packet Request to an RPS. In one embodiment, this packet is transported through use of TCP and is addressed to the RPS through use of an IP address. This request is used in special cases where a network host has not received an RPS Announcement packet (RAP) multicast. When an RPS receives a RAP Request, it sends out a RAP multicast to all interested network hosts. Note that there is no tunneling specific data associated with an RPS Announcement Packet (RAP) Request (only the common tunneling header).

Tunneling data portion 206 resides immediately after the common tunneling header. Tunneling data portion 206 is specific to each tunneling packet type and tunneling transaction type. Ownership requests are sent by the network host in order to query ownership, request ownership, or release ownership of particular local bus devices (IEEE-1394 or USB). The following are examples of requests and responses:

1) Query Owner Request. The network host may send a query owner request to an RPS. In one embodiment, this packet is transported through use of TCP and is addressed to the RPS through use of an IP address. This request is used by the network host to determine if a local device is owned, and if it is owned, determine the current owner.

Figure 15:
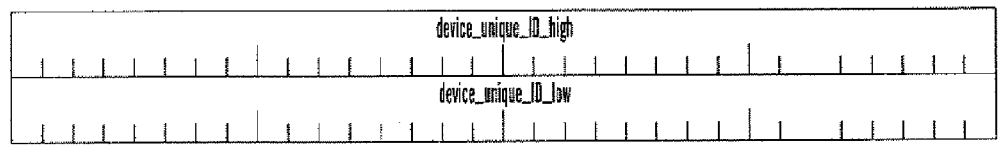
FIG. 15 is one embodiment of the Query Owner Request.

FIG. 15 is one embodiment of the Query Owner Request. The field of the query owner request of FIG. 15 is given below.

| Field | Size | Description |
| --- | --- | --- |
| device_unique_ID | 64 | This field represents a globally unique 64-bit device ID used to identify a device being tunneled. In the case of IEEE-1394 tunneling, this identifier is identical to the EUI-64 of the IEEE-1394 device. |

2) Query Owner Response. The RPS sends a query owner response after receiving a query owner request. In one embodiment, this packet is transported through use of TCP and is addressed to the network host through use of an IP address. The response contains the unique ID for the local device, as well as its current owner (if any).

Figure 16:
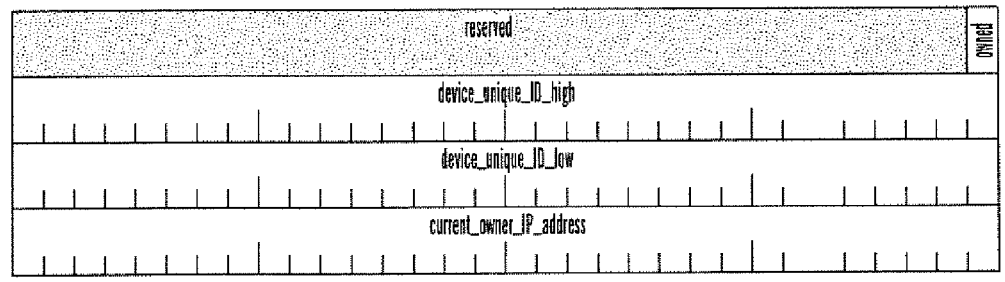
FIG. 16 is one embodiment of the Query Owner Response.

FIG. 16 is one embodiment of the Query Owner Response. Each of the fields of the query owner response of FIG. 16 are given as follows:

| Field | Size | Description |
| --- | --- | --- |
| owned | 1 | This field indicates whether the tunneled device specified by the device_unique_ID is currently owned by a network device.<br>0b = Not currently owned<br>1b = Currently owned |

-continued

| Field | Size | Description |
|---|---|---|
| device_unique_ID | 64 | This field represents a globally unique 64-bit device ID used to identify a device being tunneled. In the case of IEEE-1394 tunneling, this identifier is identical to the EUI-64 of the IEEE-1394 device. The value in this field is used to match the Query Owner Request with the Query Owner Response. |
| current_owner_IP_address | 32 | If the owned bit is set, this field indicates the IP address of the network device that owns this tunneled device. |

3) Register Ownership Request. The network host may send a register ownership request to an RPS. In one embodiment, this packet is transported through use of TCP and is addressed to the RPS through use of an IP address. This request is used by the network host to claim ownership of a particular local device. It may either claim the device only if it is currently non-owned or it may break a connection if necessary (based on the break bit). The break bit would normally not be used. This request is also used to "re-register" ownership for a device. The network host sends this request before the ownership timeout expires in order to ensure that it does not lose ownership of the device.

Figure 17:
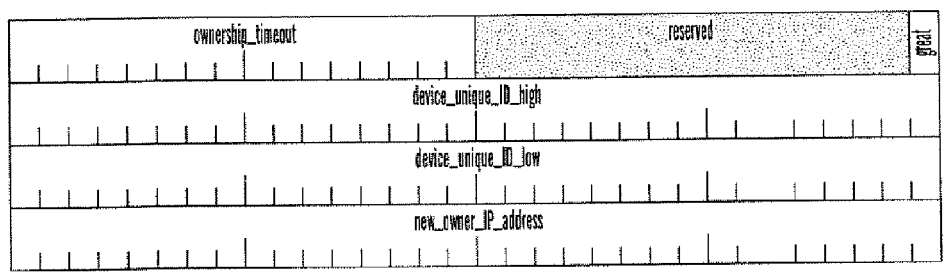
FIG. 17 is one embodiment of the Register Ownership Request.

FIG. 17 is one embodiment of the Register Ownership Request. Each of the fields of the register ownership request of FIG. 17 are shown below:

| Field | Size | Description |
|---|---|---|
| ownership_timeout | 16 | This field indicates the timeout (in seconds) before the RPS will automatically release the ownership. The network host must "re-register" by sending another Register Ownership Request before the ownership timeout expires, in order to ensure that it does not lose ownership of the device. |
| break | 1 | This field indicates whether this request should "break" the ownership of this tunneled device if it is owned by another network device.<br>0b = Do not break an existing ownership (only acquire ownership if there is no current owner)<br>1b = Break an existing ownership if necessary |
| device_unique_ID | 64 | This field represents a globally unique 64-bit device ID used to identify a device being tunneled. In the case of IEEE-1394 tunneling, this identifier is identical to the EUI-64 of the IEEE-1394 device. |
| new_owner_IP_address | 32 | The field represents the IP address of the requested new owner of the tunneled device. |

4) Register Ownership Response. The RPS sends a register ownership response after receiving a register ownership request. In one embodiment, this packet is transported through use of TCP and is addressed to the network host through use of an IP address. The response contains the unique ID for the local device, as well as its current owner. This owner may or may not be the IP address of the network device requesting ownership (depending on whether the device is already owned and whether the "break" bit is set).

Figure 18:
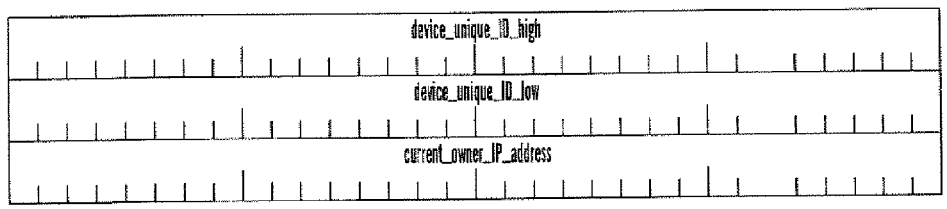
FIG. 18 is one embodiment of the Register Ownership Response.

FIG. 18 is one embodiment of the Register Ownership Response. Each of the fields of the register ownership response shown in FIG. 18 is given below:

| Field | Size | Description |
|---|---|---|
| device_unique_ID | 64 | This field represents a globally unique 64-bit device ID used to identify a device being tunneled. In the case of IEEE-1394 tunneling, this identifier is identical to the EUI-64 of the IEEE-1394 device. The value in this field is used to match the Register Ownership Request with the Register Ownership Response. |
| current_owner_IP_address | 32 | The field represents the IP address of the current owner of the tunneled device. This may either be the IP address specified in the Register Ownership Request or may be the previous owner's IP address (if an ownership was not broken). |

5) Release Ownership Request. The network host may send a release ownership request to an RPS. In one embodiment, this packet is transported through use of TCP and is addressed to the RPS through use of an IP address. This request is used by the network host to free ownership of a particular local device.

Figure 19:
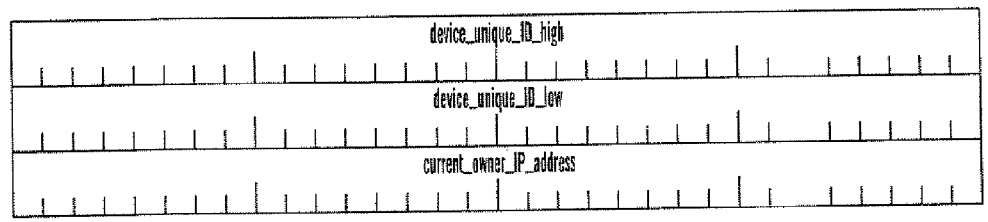
FIG. 19 is one embodiment of the Release Ownership Request.

FIG. 19 is one embodiment of the Release Ownership Request. Each of the fields of the release ownership request of FIG. 19 is given below:

| Field | Size | Description |
|---|---|---|
| device_unique_ID | 64 | This field represents a globally unique 64-bit device ID used to identify a device being tunneled. In the case of IEEE-1394 tunneling, this identifier is identical to the EUI-64 of the IEEE-1394 device. |
| current_owner_IP_address | 32 | The field indicates what the requesting network device believes is the current owner's IP address of the tunneled device. |

6) Release Ownership Response. The RPS sends a release ownership response after receiving a release ownership request. In one embodiment, this packet is transported through use of TCP and is addressed to the network host through use of an IP address.

Figure 20:
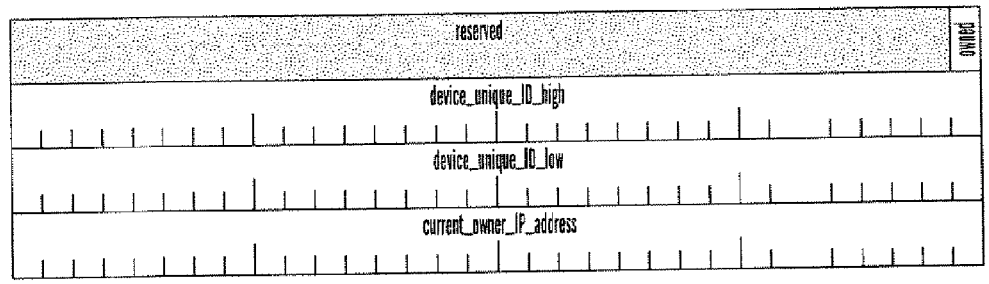
FIG. 20 is one embodiment of the Release Ownership Response.

FIG. 20 is one embodiment of the Register Ownership Response. Each of the fields of the register ownership response of FIG. 20 is given below:

| Field | Size | Description |
|---|---|---|
| owned | 1 | This field indicates whether the ownership of the tunneled device was successfully released. If the specified current_owner_IP_address in Release Ownership Request was not the current owner, then the device ownership will not be released. |

-continued

| Field | Size | Description |
|---|---|---|
| | | 0b = The tunneled device is no longer owned (successfully released ownership)<br>1b = The tunneled device is currently owned (a different network device owns the tunneled device) |
| device_unique_ID | 64 | This field represents a globally unique 64-bit device ID used to identify a device being tunneled. In the case of IEEE-1394 tunneling, this identifier is identical to the EUI-64 of the IEEE-1394 device. The value in this field is used to match the Release Ownership Request with the Release Ownership Response. |
| current_owner_IP_address | 32 | If the owned bit is set, this field indicates the IP address of the network device that owns this tunneled device. |

RPS Announcement Packets (RAPs)

In a typical network environment, there will be many network hosts communicating with each other through routers and switches. There may also be numerous Remote Peripheral Server (RPS) implementations throughout the network. In one embodiment, tunneling of USB or IEEE-1394 bus events occurs between particular network hosts (serving as tunneling endpoints) and Remote Peripheral Servers (also serving as tunneling endpoints). Remote Peripheral Servers may optionally tunnel between each other.

One embodiment of a method for discovery of the Remote Peripheral Servers on the network is set forth below. Network hosts interested in communicating with a particular RPS (for tunneling purposes) use a method of discovering the Remote Peripheral Servers on the network. A traditional solution to this problem would involve users or administrators manually specifying names or IP addresses of Remote Peripheral Servers to the interested network hosts. This is how many print servers today are "discovered" on the network. This is not an ideal solution, since it requires users or administrators to manually track the Remote Peripheral Servers on the network.

Through use of the RPS Announcement Packet (RAP) and IP multicast, a more seamless and automatic method of RPS discovery is possible. An RPS Announcement Packet (RAP) is multicast within a UDP datagram. In one embodiment, this consists of the common tunneling header and RPS Announcement Packet specific to USB or IEEE-1394. Interested network hosts (or other Remote Peripheral Servers) listen to the tunneling multicast port for RPS Announcement Packets (RAPs) in order to determine the location and configuration of Remote Peripheral Servers. Note that in alternative embodiments, multicast is not used and a point-to-point communication occurs.

In one embodiment, an RPS Announcement Packet (RAP) is multicast by a Remote Peripheral Server in the following cases:

When an Remote Peripheral Server (RPS) is first powered on

When any change in local bus configuration occurs (e.g. an IEEE-1394 or USB device is inserted or removed from the local bus)

When prompted to do so via a RPS Announcement Packet (RAP) Request sent by a network host Periodically (once every minute), in order to ensure that all interested network hosts are up-to-date In one embodiment, the multicast group management is handled via IGMP or ICMP.

An RPS Announcement Packet (RAP) may include the following general types of information:

Source IP Address of the RPS generating the RAP;

Globally unique identifier of the RPS generating the RAP;

Current "generation" count of the local bus (number of times a bus reconfiguration has occurred);

Status of the local USB or IEEE-1394 node (e.g. IEEE-1394 local node is Bus Manager, Isoch Resources Manager, ROOT, etc.);

Topology map and configuration of the local USB or IEEE-1394 bus (e.g., for IEEE-1394, topology map, configuration ROMs of all devices attached to the IEEE-1394 bus); and Current network "owners" of each device connected to the local USB or IEEE-1394 bus (i.e. IP address of network "owners").

IEEE-1394 and USB Optimizations

Immediate Completion of IEEE-1394 Split Transactions in Software

Most asynchronous IEEE-1394 transactions from a particular device are serialized in order to guarantee order of delivery and because IEEE-1394 is a bus, not a network (so transaction and wire delays are not an issue). This may cause problems when tunneling because the latencies involved in confirmation of an individual packet or completion of a split transaction across a network are very large.

Figure 21:
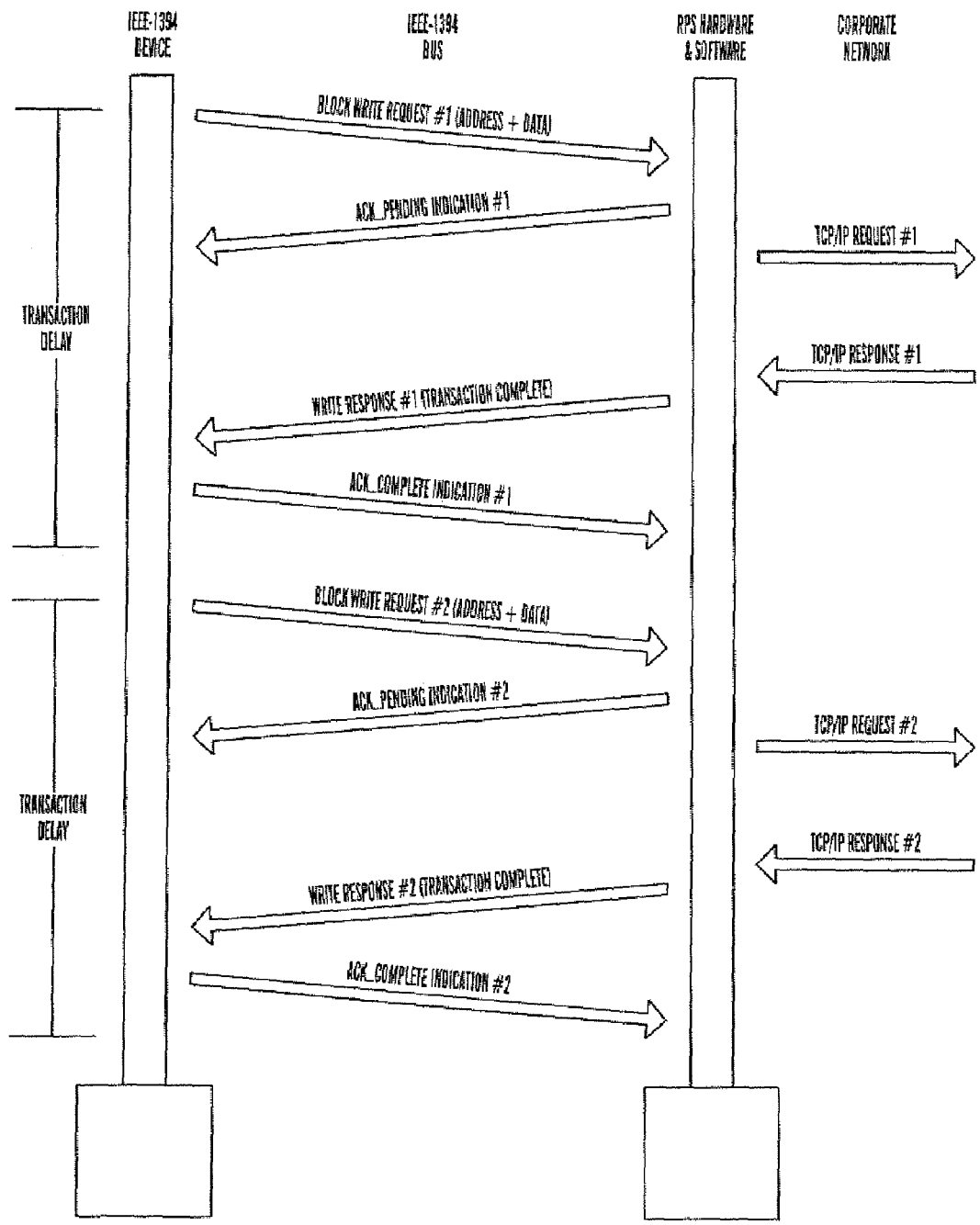
FIG. 21 illustrates one embodiment of the process of transporting IEEE-1394 transactions using TCP/IP packets.

FIG. 21 describes one embodiment of a process of tunneling IEEE-1394 transactions across a network. Following is the basic sequence of operations:

1) An IEEE-1394 device generates a Block Write Request, which is received by the RPS hardware (and put in its first-in/first-out (FIFO)).

2) The RPS hardware generates an immediately automated ACK_Pending indication, informing the IEEE-1394 device that the transaction is pending (waiting for a confirmation).

3) The RPS software then encapsulates the IEEE-1394 Block Write Request into a TCP/IP packet (with a tunneling header) and transmits the packet over the network.

4) At a time in the future (delays due to network latencies), a TCP/IP response is received, confirming that the Block Write Request data has been delivered into the network host's memory.

5) At this time, RPS software sends an IEEE-1394 Write Response to the IEEE-1394 device (indicating that the transaction has been completed).

6) The IEEE-1394 device sends an ACK_Complete indication to let the RPS hardware/software know that the Write Response was received.

This sequence of events is necessary in order to guarantee that the data has been delivered across the network into the network host's memory before indicating that the IEEE-1394 transaction is complete. This, however, results in a complete network transaction delay between each IEEE-1394 bus transaction and severely impacts performance.

By making the assumption that through use of TCP as a delivery mechanism over the network, reliable and in-order data delivery can be guaranteed, and by also understanding that most asynchronous based 1394 protocols have a status phase following data transfer, some performance optimizations can be made.

Figure 22:
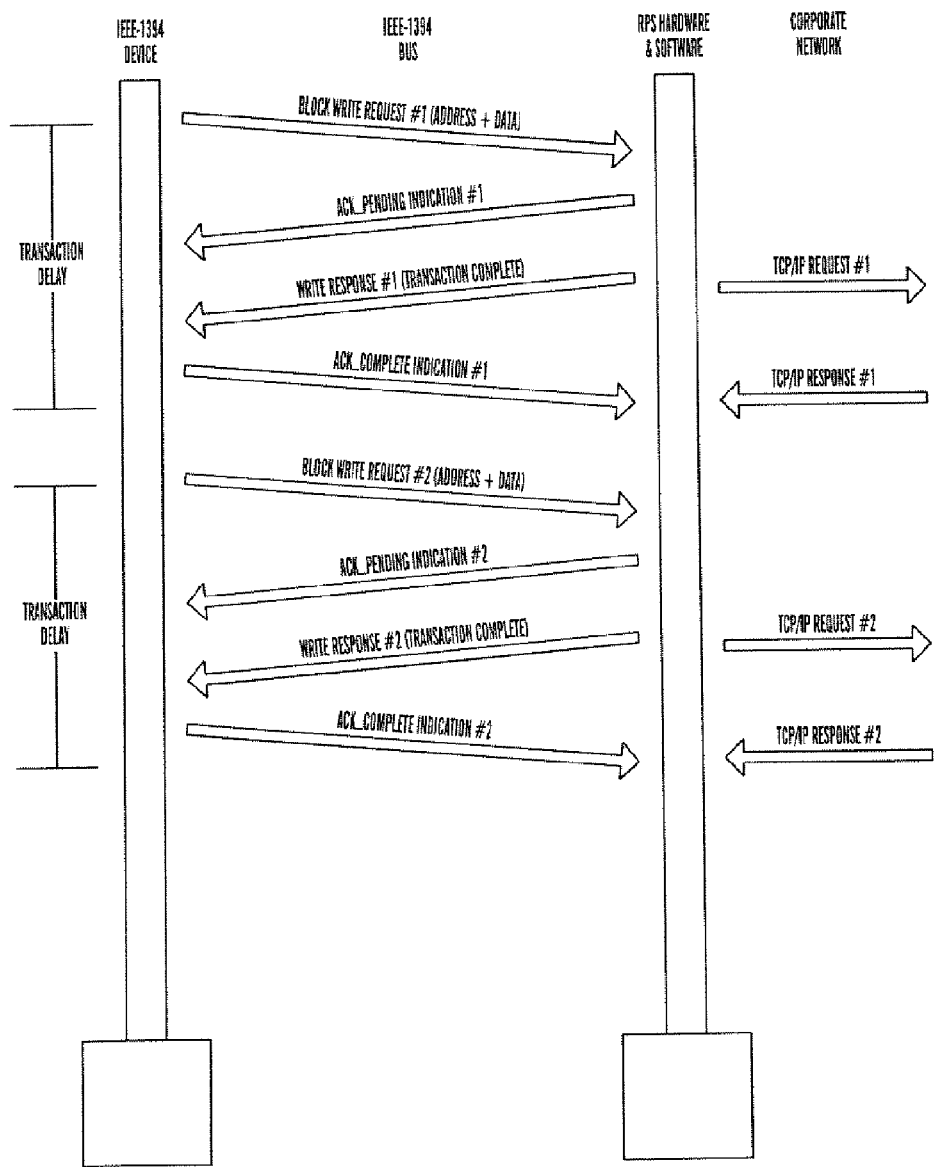
FIG. 22 illustrates an alternative embodiment of the process of transporting IEEE-1394 transactions to TCP/IP packets.

For example, after step 2 described above, the Block Write Request can be "posted" on the RPS by completing the split transaction immediately in software and not putting the split transaction over the network. Then the Block Write Request is sent out over TCP, which can be counted on to guarantee in-order delivery. By completing the IEEE-1394 transaction quickly (without waiting for the network confirmation), the IEEE-1394 device is allowed to immediately begin the next Block Write. This improves performance greatly by eliminating the network transaction latencies. This sequence is shown in FIG. 22, and the basic operations can be described as follows:

1) An IEEE-1394 device generates a Block Write Request, which is received by the RPS hardware (and put in its FIFO).
2) The RPS hardware generates an automated ACK_Pending indication immediately, informing the IEEE-1394 device that the transaction is pending (waiting for a confirmation).
3) The RPS software immediately sends an IEEE-1394 Write Response to the IEEE-1394 device (indicating that the transaction is complete).
4) The IEEE-1394 device sends an ACK_Complete indication to inform the RPS hardware/software that the Write Response was received. The IEEE-1394 device may now send its next Block Write Request immediately.
5) Thereafter, the RPS software encapsulates the IEEE-1394 Block Write Request into a TCP/IP packet (with a tunneling header) and transmits the packet over the network.
6) At a time in the future, (delays due to network latencies), a TCP/IP response is received, confirming that the Block Write Request Data has been delivered into the network host's memory.

Hardware "Posting" of IEEE-1394 Requests to Eliminate Split Transactions

A second hardware optimization to improve performance when tunneling asynchronous transactions across a network is to give the RPS support (e.g., hardware or software support) for "posting" of non-physical IEEE-1394 write request transactions. This is done to completely eliminate the split transaction on the IEEE-1394 bus. By having the additional support in the RPS return an ACK_Complete indication to non-physical write requests (on a per-node basis), a unified transaction results, thereby allowing the target to even more quickly begin its next write transaction.

This optimization can be done by following the same logic sequence as detailed above in "Immediate Completion of IEEE-1394 Split Transactions in Software." This further improves performance by not only by eliminating the network transaction latencies, but also by eliminating the RPS software latencies in generating a write response, as well as reducing the total number of transactions on the IEEE-1394 bus itself (changing the split transaction into a unified transaction).

Figure 23:
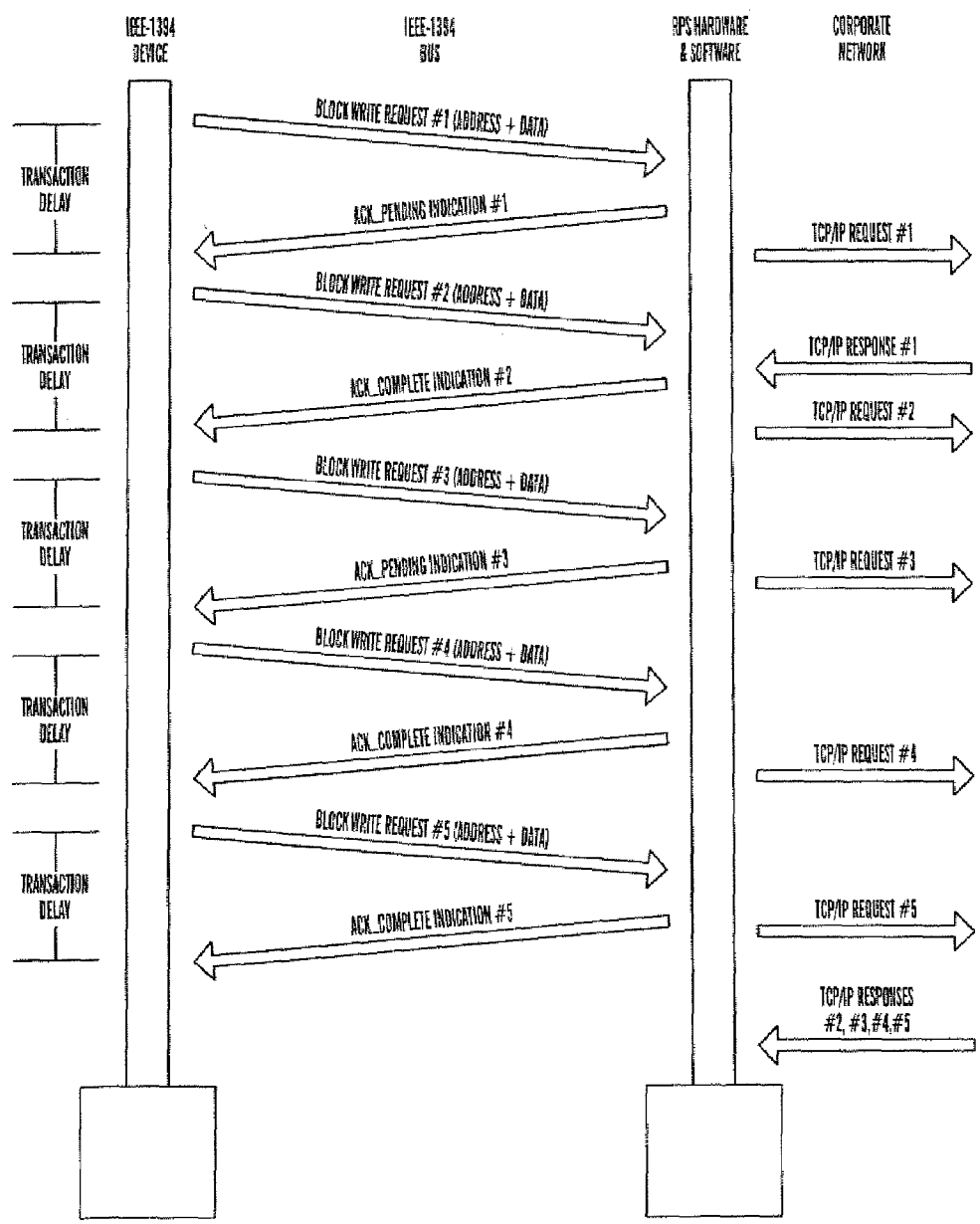
FIG. 23 illustrates still another embodiment of the process of transporting IEEE-1394 transactions to TCP/IP packets.

The basic sequence is described in FIG. 23, and the operations may be described as follows:

1) An IEEE-1394 device generates a Block Write Request, which is received by the RPS hardware (and put in its FIFO).
2) The RPS hardware generates an automated ACK_Complete indication immediately, informing the IEEE-1394 device that the transaction has been completed (the data has been "posted" into the FIFO). The IEEE-1394 device may now send its next Block Write Request.
3) Thereafter, the RPS software encapsulates the IEEE-1394 Block Write Request into a TCP/IP packet (with a tunneling header) and transmits the packet over the network.
4) At a time in the future (delays due to network latencies), a TCP/IP response is received, confirming that the Block Write Request Data has been delivered into the network host's memory.

By reducing the IEEE-1394 split transactions to unified transactions and "posting" the transactions (allowing the IEEE-1394 device to continue making requests), advantageous use of the windowing of TCP/IP (instead of serializing network requests) may occur.

Reduction of IEEE-1394 Traffic Over the Network During Bus Reconfiguration

In IEEE-1394, a sequence of events or steps generally occurs after each bus reconfiguration (a device is removed or added to the bus, or a device generates a bus reset). One embodiment of this sequence generally as follows:

1) Bus reset and self-identification process occurs. This is automated by IEEE-1394 physical interface silicon.
2) IEEE-1394 Bus manager contention occurs to determine who manages the bus.
3) The IEEE-1394 host device reads the complete Configuration ROM of each IEEE-1394 device on the bus. In one embodiment, the read occurs using Quadlet Read Request transactions. In one embodiment, the information in the Configuration ROM includes device capabilities, device type and vendor identification information, and a globally unique 64-bit identifier.
4) If the IEEE-1394 host device is not ROOT (the highest node ID), it determines if the current ROOT device is capable of sending IEEE-1394 cycle start packets. If not, then the host device performs an additional bus reset (forcing itself to become ROOT through use of a phy configuration packet).
5) Software on the host then determines which device drivers should be loaded and maintains the local Node ID to globally unique ID mappings.

This sequence of events can result in a large number of individual IEEE-1394 transactions on the bus following each bus reconfiguration (thousands of individual transactions are possible, depending on the number of local IEEE-1394 devices on the bus). This is acceptable for the IEEE-1394 bus itself, since there is very little latency between transactions. However, when tunneling these transactions across a network, the time and traffic involved in dealing with the large number of transactions may result in significant problems. These problems become magnified when there are many bus reconfigurations occurring (this can happen if there is a bus reset "storm," or if devices are removed/added often).

This problem is further complicated by the fact that there may be many network hosts interested in the IEEE-1394 bus reconfiguration, resulting in each network host duplicating the network tunneling transactions necessary to complete the bus reconfiguration process.

In one embodiment, the IEEE-1394 bus reconfiguration process is optimized by adding a certain level of intelligence to the RPS and by using a tunneling format for encapsulating the entire bus reconfiguration process. By doing so, the many network transactions can be reduced to a single larger transaction.

In one embodiment, the IEEE-1394 RPS Announcement Packet (RAP) handles this process. Essentially, the optimization involves moving the intelligence to deal with all of steps of IEEE-1394 bus reconfiguration described above from the network host to the RPS software/hardware itself. The RPS software completes these steps locally to the bus and multicasts an RPS Announcement Packet (RAP) over the network. This packet may alternatively be unicast to a central server that interested network hosts communicate with.

The RPS announcement packet includes all information that network hosts would require following a IEEE-1394 bus reconfiguration process, reducing network traffic greatly. In one embodiment, the RPS Announcement Packet includes the following general types of information: the current IEEE-1394 generation count; the current state of the RPS itself (Isochronous Resource Manager, Bus Manager, ROOT, etc.); the complete local IEEE-1394 bus Topology Map following the bus reconfiguration; the complete Configuration ROM of each IEEE-1394 device on the bus; and the current network host owners of each IEEE-1394 device on the bus.

Additional software is also added to the network host to be able to receive the RPS Announcement Packet and internally (to the network host) complete IEEE-1394 transactions oriented towards dealing with bus reconfiguration.

Tunneling of USB URBs Rather than Transactions Over the Network to Increase Performance Tunneling may be performed on individual USB transactions (e.g., bulk, interrupt, control, status) over a network in a similar manner to how IEEE-1394 transactions are tunneled. There may be several problems with this approach. First, individual USB transactions are quite small in size in relation to network packets. This can result in a very large number of very small network packets. This is a very inefficient way of utilizing network bandwidth and dealing with transaction latencies. Second, on USB, there are very tight packet timing constraints for the bus. Network transaction latencies do not allow for these tight timing constraints. Thirdly, current USB hardware (OHCI and UHCI) includes support for the handling of multiple transactions at the hardware level. There is a performance impact in tunneling individual USB transactions and having either the host or RPS software deal strictly at the transaction level.

In one embodiment, the level of tunneling is changed from USB transaction level to the USB URB level. The general URB format is described in Win32 Driver Model (WDM) Device Driver Kit (DDK) available for Microsoft Corporation of Redmond, Wash. Instead of tunneling individual USB transactions (e.g., bulk, interrupt, control, status) over the network, complete URB-like requests are tunneled (with a tunneling header). This allows the transfer of large blocks of data, instead of small individual USB transactions. It also alleviates the tight individual packet timing constraints of the USB bus and allows the USB silicon to handle multiple transactions.

Following are the general types of requests that are tunneled for USB (URB-like): Open Endpoint; Close Endpoint; Get Endpoint State; Set Endpoint State; Sync Frame; Abort Pipe; Get Current Frame Number; Get Frame Length; Release Frame Length Control; Reset Pipe; Select Configuration; Set Frame Length; Take Frame Length Control; Control Transfer; Bulk or Interrupt Transfer; Isoch Transfer. Network ownership and configuration requests are also tunneled.

Buffering of IEEE-1394/USB Isochronous Data to Manage Network Latencies

Both IEEE-1394 and USB have an isochronous mode of operation which allows for unconfirmed delivery of low-latency time-sensitive multimedia data. In one embodiment, the isochronous data transfer is based on a master bus clock (125 us clock for IEEE-1394), allowing for precise flow and data rate control.

Ethernet and Fast Ethernet are both based on Carrier Sense Multiple Access, with Collision Detection (CSMA/CD). Because Ethernet systems share the same cable and use CSMA/CD, there is no bounded worst case latency for frame transmission, making low-latency time-sensitive data transfer difficult. Bandwidth reservation is also not built into Ethernet itself, making it a poor choice for multimedia data transfers. These limitations have been worked around in some cases through use of switched Ethernet and protocols such as RSVP and RTP/RTCP, but none of these solutions are universally available.

In one embodiment, to overcome these limitations when tunneling isochronous transactions from IEEE-1394 or USB busses over Ethernet, the RPS performs the encapsulation/decapsulation between the bus and network at the transaction level. For example, each isochronous packet received from the IEEE-1394 bus is encapsulated and sent out on Ethernet within the UDP/IP portion of the packets. This may work in some cases of very low network load, but in many cases packets may be lost or delivered with too much latency.

In one embodiment, a method of more adequately delivering the isochronous characteristics over Ethernet involves the intelligent buffering of data using the RPS software. Several tunneling packet types and fields aid on the intelligent buffering of isochronous data with the RPS. By intelligently buffering isochronous data within the RPS, the temporary network latencies due to CSMA/CD may be overcome as well as temporary bandwidth problems.

The Allocate Isochronous Resources Request tunneling packet type allows the RPS software to manage the buffering of isochronous data in an intelligent manner. Additionally, it allows the RPS to use RSVP to allocate bandwidth from routers along the source/destination path and determine network delays.

In one embodiment, the field max_packet_size within the Allocate Isochronous Resources Request determines the worst case isochronous network throughput requirements. This number may be used in allocating bandwidth from routers (RSVP) and to determine how many packets should be buffered in RPS memory.

Max Network Bandwidth Required=max_packet_size×8000 (for IEEE-1394)

The field tolerable_latency within the Allocate Isochronous Resources Request tunneling packet type specifies the maximum latency allowable between the time when a tunneling packet is received from the network and the time when it is transmitted on the local IEEE-1394 local bus (or vice versa). In one embodiment, this field is specified in IEEE-1394 cycles (8000 cycles/second) and is filled in by the network host based on its network latency requirements. A smaller tolerable_latency value indicates the isochronous data will be transferred in a more "real-time" manner (less buffering), but data may be lost due to temporary network latencies or bandwidth problems. A larger tolerable latency value indicates that less isochronous data will be lost due to network latency or bandwidth problems, but the data will be less "real time" in nature (more buffering).

Max Packets Buffered in RPS
  Memory=tolerable_latency×8000 (for IEEE-1394)

IEEE-1394/USB Isochronous Data Flow Control Over the Network

As stated above, both IEEE-1394 and USB have an isochronous mode of operation which allows for unconfirmed delivery of low-latency time-sensitive multimedia data. The isochronous data transfer is based on a master bus clock (125 us clock for IEEE-1394), allowing for precise flow and data rate control. Ethernet and Fast Ethernet do not contain a master clock for managing real-time isochronous data flow and data rate control. There are mechanisms built into Ethernet and TCP (windowing) that allow for some flow control, but these mechanisms are somewhat imprecise and are primarily used only to prevent overloading a network host receiving data (since a network host could transmit data at a higher rate than another host can receive it).

In one embodiment, a mechanism abstracts some of the isochronous characteristics of IEEE-1394 and USB over the network (via the tunneling described). In the case of a network host transferring data to an RPS, the network host does not have any method to ensure that its data transmission rate exactly matches the isochronous data rate needed by the local USB or IEEE-1394 bus. This mechanism has been developed through use of the Isochronous Data Confirmation tunneling packet type. The RPS sends an Isochronous Data Confirmation packet in response to actual transmission/reception on the local IEEE-1394 or USB bus of a particular isochronous data packet (as specified by the "ind" bit field in the Isochronous Data packet tunneling packet type). The network host transmitting the isochronous data (via tunneling) receives this Isochronous Data Confirmation packet periodically, so it can determine when it should continue sending isochronous data.

There are also several other fields in the Isochronous Data Confirmation tunneling packet type used in order to abstract the isochronous timing of the local bus across the network. The sequence_number field represents the sequence number "context" specified in the Isochronous Data Packet tunneling packet type. It is returned in this packet in order to allow the matching of Isochronous Data packets and Isochronous Data Confirmations. The cycle_offset field is IEEE-1394 specific and represents the cycle offset (from the local bus cycle count) of the actual transmit time from the SYT/SPH fields in the Common Isochronous Packet (CIP) used by IEEE-1394 A/V devices. This field allows the network host to manage "presentation" times of data over IEEE-1394, even though the network host is not aware of the local IEEE-1394 cycle count. The absolute_cycle_time field represents the actual transmit time of the isochronous data on the IEEE-1394 local bus. This field allows the network host to synchronize its internal cycle count (in software) with the IEEE-1394 cycle count.

Mapping 10 Mbit Ethernet performance with IEEE-1394

In order to transmit 512 bytes (4096 bits) of 1394 data over an 10 Mbit/s Ethernet network requires 409.6 microseconds. This approximately 420 microseconds only refers to actual data transmission time over the medium and does not include any other time associated with packet transmission over Ethernet. However, because of this delay, it may be necessary for the 1394 software on the RPS to pace the 1394 transactions on the 1394 bus for asynchronous packets.

In one embodiment, 1394 DMA channel programs are written to accommodate the slower 10 Mbit-Ethernet rate.

It is apparent that isochronous traffic is much more difficult to manage over a 10 Mbit/s port. In one embodiment, one isochronous packet is sent every 420 microseconds. Thus, using this embodiment, three out of four isochronous packets will be dropped. In an alternate embodiment, the RPS is "data aware" such that a full "frame" of information is buffered and sent. While transmitting a frame, the RPS discards isochronous traffic until the "frame buffer" is freed. In other words, the RPS can buffer full frames of data, such that a coherent packet can be sent across the network to maintain some level of data integrity, while other frames are dropped.

By being "data aware," the RPS understands and interprets the isochronous data on the bus. That is, if video data is being transmitted, the RPS reconstructs a frame and begins transmission of a frame rather than individual isochronous packets. Until the buffer is free, the RPS continues to drop all other isochronous traffic.

For isochronous support, if both asynchronous and isochronous traffic exists over a 10 Mbit port, then additional isochronous data would be lost during the transmission of the asynchronous packet. Supporting multiple asynchronous packets from different nodes is possible. However, the performance degrades as additional traffic is added. Again, in one embodiment, the 1394 DMA channel programs are written to accommodate for the slower port speed.

Ownership of IEEE-1394/USB Devices Over the Network

With tunneling of transactions involving network hosts and local bus devices, a concept of "ownership" may be necessary. Each local bus device may only communicate with one network host at a time. This logical connection between the local bus device and the network host is termed "ownership." The network device exclusively "owns" a particular local bus device for a session of communication. When it no longer needs to communicate with the local bus device, it may release the device, thereby allowing other network hosts to attempt to "own" the device. This ownership may be necessary for both USB and IEEE-1394. This ownership may be necessary because of two reasons. First, USB allows for many devices, but only one host is allowed. Because of this, there is no way to manage multiple network hosts talking to a single USB target device. Second, for IEEE-1394 the RPS appears as a single node on the local bus. Other peers on the IEEE-1394 local bus do not know how to address multiple network hosts on the other side of the buses (are not aware of devices outside their own local bus). They only know how to communicate with the single IEEE-1394 node on the RPS.

In addition to tunneling of IEEE-1394 and USB transactions themselves, ownership tunneling packet types are included to manage the network ownership of local IEEE-1394 and USB devices. These ownership tunneling packet types are sent in order to query current ownership, request ownership, or release ownership of particular IEEE-1394 or USB local bus devices.

Again, these basic tunneling packet types are described above and include: Query Owner Request; Query Owner Response; Register Ownership Request; Register Ownership Response; Release Ownership Request; Release Ownership Response.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A system comprising:
a network having a host coupled thereto, the network operating asynchronously, the host executing software to generate packets for communication on the network;
a bus with a bus device coupled thereto, wherein the bus device generates isochronous data, such that the isochronous data is transported over the asynchronous network;
an interface coupling the network to the bus, the interface and the host coordinating to tunnel bus device packets over the network between the host and the bus device, wherein the host runs an application that generates the bus device packets, the bus device packets being isochronous data, and relies on an operating system that includes a driver for the bus device, the driver to issue the bus device packets and redirect the bus device packets to a network stack that encapsulates the bus device packets to create a network packet and sends the network packet to the bus device via the interface, the interface to decapsulate the network packet to obtain the bus device packet and forward the bus device packet to the bus device.

2. The system defined in claim 1, wherein the interface generates network packets that encapsulate bus events in a network protocol portion.

3. The system defined in claim 2, wherein the network protocol portion comprises an Internet Protocol (IP) portion.

4. The system defined in claim 2, wherein the network protocol portion includes a header for information to recreate bus events.

5. The system defined in claim 1, wherein each network packet includes a tunneling header and a tunneling data portion, wherein the tunneling data portion is specific to each tunneling packet type and tunneling transaction type, and the tunneling header is common among tunneling packet types.

6. The system defined in claim 5, wherein the tunneling header includes a field which specifies the type of packet as one of a group of control packet, an information packet, or an ownership packet.

7. The system defined in claim 5, wherein the tunneled packet comprises an IEEE 1394 packet.

8. The system defined in claim 5, wherein the tunneled packet comprises a USB packet.

9. The system defined in claim 5, wherein the tunneling header indicates the packet type and transaction type.

10. The system defined in claim 1, wherein the interface comprises a remote peripheral server.

11. The system defined in claim 1, wherein the network comprises an Internet Protocol (IP) Ethernet network.

12. The system defined in claim 1, wherein the bus comprises a serial bus.

13. The system defined in claim 1, wherein the bus comprises a parallel bus.

14. The system defined in claim 1, wherein the bus adheres to the IEEE-1394 bus standard.

15. The system defined in claim 1, wherein the bus adheres to the Universal Serial Bus Standard (USB).

16. A system comprising:
a network having a host coupled thereto, the network operating asynchronously, the host executing software to generate packets for communication on the network;
a bus with a bus device coupled thereto, wherein the bus device generates isochronous data, such that the isochronous data is transported over the asynchronous network
an interface coupling the network to the bus, the interface and the host coordinating to tunnel bus device packets over the network between the host and the bus device, wherein the bus device generates the bus device packets, the bus device packets being isochronous data, for transport to the host and sends the bus device packets on the bus, the interface to encapsulate the bus device packets into a network packet and forward the network packet to the host, the host to execute a network driver that decapsulates the network packet, identify the bus device packets therein and redirect the bus device packets to a bus device driver running thereon.

17. The system defined in claim 16, wherein the interface generates network packets that encapsulate bus events in a network protocol portion.

18. The system defined in claim 17, wherein the network protocol portion comprises an Internet Protocol (IP) portion.

19. The system defined in claim 17, wherein the network protocol portion includes a header for information to recreate bus events.

20. The system defined in claim 16, wherein each network packet includes a tunneling header and a tunneling data portion, wherein the unending data portion is specific to each tunneling packet type and tunneling transaction type, and the tunneling header is common among tunneling packet types.

21. The system defined in claim 20, wherein the tunneling header includes a filed which specifies the type of packet as one of a group of control packet, an information packet, or an ownership packet.

22. The system defined in claim 20, wherein the tunneled packet comprises an IEEE 1394 packet.

23. The system defined in claim 20, wherein the tunneled packet comprises a USB packet.

24. The system defined in claim 20, wherein the tunneling header indicates the packet type and transaction type.

25. The system defined in claim 16, wherein the interface comprises a remote peripheral server.

26. The system defined in claim 16, wherein the network comprises an Internet Protocol (IP) Ethernet network.

27. The system defined in claim 16, wherein the bus comprises a serial bus.

28. The system defined in claim 16, wherein the bus comprises a parallel bus.

29. The system defined in claim 16, wherein the bus adheres to the IEEE-1394 bus standard.

30. The system defined in claim 16, wherein the bus adheres to the Universal Serial Bus Standard (USB).

* * * * *